United States Patent [19]
Smith et al.

[11] Patent Number: 5,945,932
[45] Date of Patent: Aug. 31, 1999

[54] TECHNIQUE FOR EMBEDDING A CODE IN AN AUDIO SIGNAL AND FOR DETECTING THE EMBEDDED CODE

[75] Inventors: Gregory L. Smith; John H. D. Wiltshire, both of Toronto; Marvin C. Nolan, Lachine, all of Canada

[73] Assignee: Audiotrack Corporation

[21] Appl. No.: 08/961,297

[22] Filed: Oct. 30, 1997

[51] Int. Cl.⁶ .................................................. H03M 7/00
[52] U.S. Cl. .............................................. 341/51; 375/316
[58] Field of Search .................................. 341/51, 94, 54, 341/55; 375/316, 377

[56] References Cited

U.S. PATENT DOCUMENTS 5,796,785   8/1998   Spiero .......................................  375/316

*Primary Examiner*—Brian Young
*Attorney, Agent, or Firm*—Frishauf, Holtz, Goodman, Langer & Chick, P.C.

[57] ABSTRACT

A code is embedded into an audio product so as to be processed therewith for recording and/or broadcast and yet be reliably detected while remaining inaudible to human perception. The code is represented by symbols formed from an impulse function having its energy within a specified frequency range. The audio product is analyzed to find segments which can mask the code based on tonality and a minimum signal energy. When the audio product with an embedded code is detected, decoding thereof involves finding candidate code signals which are checked against preset criteria. In particular, each symbol is made of at least two impulse functions with a preset spacing therebetween.

24 Claims, 13 Drawing Sheets

5,945,932

TECHNIQUE FOR EMBEDDING A CODE IN AN AUDIO SIGNAL AND FOR DETECTING THE EMBEDDED CODE

BACKGROUND OF THE INVENTION

The invention is directed to an improved technique for coding an audio signal and, in particular, to embedding a code into an audio signal so that a decoder can detect the code reliably despite signal degradation.

Audio signals are generated in a variety of ways, such as by radio and television stations, and transmitted in various ways, such as by means of airwaves, cable and satellite as well as distributed on magnetic tape and storage disc (e.g. optic, magnetic) media. Various benefits are derived from identifying these audio signals which constitute "audio products" in the form of programs or commercials, for example. The audio products can be broadcast by radio, television or cable stations and/or stored on tape, CD-ROM or other media for replay by the consumer. By being able to automatically distinguish one audio product from another, it becomes possible to perform a variety of services. For example, air time verification is possible to verify for an advertiser that a commercial has actually been broadcast, and that it was aired in its entirety, at the proper time and in the locations that were paid for. In addition, performance royalty revenues can be more accurately calculated based on the frequency with which a piece of music, say, has been broadcast. For these and other reasons, it is highly desirable to know when a particular audio product has been "performed" in the sense that it has been heard by any member(s) of a listening audience. Furthermore, the listening (or watching) audience can be measured by having individual members or individual households equipped with devices capable of identifying certain designated audio products, and then processing the resultant data. This can help measure the popularity of a program so that its value to advertisers can be assessed. Also, the exposure of an audience to a commercial can be measured this way, and such information can be combined with other data to determine the effectiveness of that commercial in terms of how well it is remembered and/or the resulting purchases made thereafter.

The automation of this identification by the prior art has involved various techniques for embedding a code in the audio product. The resulting signal is reproduced by, say, a speaker of a radio or television set. The embedded code is also reproduced by the speaker so that it can be detected by a sensing device for data storage and/or processing to yield the desired information. Various types of encoding schemes are known. However, they have proved to be unsatisfactory for one or more of the following reasons. If the code is easily removable without permission, then the accuracy of the desired measurement will obviously be skewed. Therefore, it is important for the embedded code to be "indelible" in the sense that it cannot be removed without seriously (or at least noticeably) damaging the audio product. Also, the code must not create any audible deterioration in the quality of the audio product itself, i.e. which can be discerned by a human listener. Furthermore, the code must have adequate immunity to noise which occurs during the sending, playback and receiving operations of the encoded audio product. For example, an audio product is typically exposed to various phase shifts and time shifts in the process of being recorded and/or broadcast. In addition, the audio product may be compressed by a bit rate reduction system based on psychoacoustic compression techniques, such as EUREKA 147, DOLBY AC3, and MPEG2. (The term "psychoacoustic" has to do with the human auditory response to a sound stimulus.) The code must withstand such processing while still maintaining its characteristics for enabling it to be reliably recovered by the decoder while remaining inaudible. Meeting all of these requirements has proven to be too tall of an order for the prior art, particularly when combined with the need to minimize the complexity of the apparatus and method, and to carry out the technique quickly and efficiently.

SUMMARY OF THE INVENTION

One object of the present invention is to provide an improved technique for identifying an audio product with an embedded code.

Another object of the present invention is to embed the code indelibly.

A further object of the present invention is to embed the code in such a way that it is not discernible to the listener when the audio product is reproduced audibly.

One other object is to provide an improved encoding technique.

Still another object of the present invention is to recover the embedded code despite signal degradation.

Yet another object of the present invention is to recover the embedded code despite signal compression.

One other object of the present invention is to provide an improved decoding technique.

Another object of the present invention is to enable adaptive masking of the code within the audio product.

These and other objects are attained in accordance with one aspect of the invention directed to a method and apparatus for embedding a digital code in a digitized audio product by filtering the digitized audio product to a frequency band of interest. A tonality indication is determined for each of a plurality of segments of the filtered audio product which indicates the extent to which power is distributed uniformly for frequencies in at least a portion of the band of interest. At least a portion of the digital code is inserted into a particular segment from the plurality of segments only if the tonality indication indicates a relatively uniform power distribution in that particular segment.

Another aspect of the present invention is directed to a method and apparatus for embedding a digitized code in a digitized audio product by filtering the digitized audio product to a frequency band of interest, and providing a coding signal derived from a band-limited impulse function with a waveform having its energy confined to and evenly spread across at least a portion of the frequency band of interest. The digitized code is derived from the coding signal, and the digitized code is inserted into the audio product.

Yet another aspect of the present invention is directed to a method and apparatus for providing a digitized code to be embedded in a digitized audio product by providing the digitized code as a series of binary bits, and dividing the binary bits into groups, each group having a plurality of bits. Coding signals are provided to represent the bits, respectively. A symbol is derived from the coding signals for each of the groups, each symbol having a plurality of the coding signals with a preset spacing therebetween.

One other aspect of the present invention is directed to a method and apparatus for encoding and decoding a digitized code embedded in a digitized audio product by deriving the digitized code in a form of start, data and end symbol types, each symbol representing a plurality of bits, and each bit being associated with a coding signal of given polarity. The start type of symbol is generated to consist of a plurality of the coding signals all of which have the same designated polarity. The digitized code is embedded in the digitized audio product. The digitized code embedded in the audio product is detected, and the detected digitized code is decoded by determining whether the polarity of the coding signals on the start type of symbol is the designated polarity and, if not, inverting the polarity of the coding signals in the data and end types of symbols.

Still another aspect of the present invention is directed to a method and apparatus for embedding a digitized code in a digitized audio product by identifying segments of the digitized audio product into which the digitized code can be embedded based on predetermined criteria. Portions of the digitized code are generated for insertion into the segments, respectively. The digitized audio product within the identified segments is removed, except for a predetermined small percentage of amplitude, to generate modified segments, and the portions of the digitized code are inserted into the modified segments, respectively.

A further aspect of the present invention is directed to a method and apparatus for embedding a digitized code in a digitized audio product by analyzing the digitized audio product to derive measured values for designated characteristics thereof. Segments of the digitized audio product are located, based on the derived measured values and a set of preselected parameters, into which the digitized code can be inserted so as to be masked. The digitized code is inserted into the located segments, and a determination is made whether a degree of masking of the inserted digitized code meets a predetermined level and, if not, modifying values of at least one of the set of preselected parameters. Then, the locating and inserting steps are performed again with the modified values.

A still further aspect of the present invention is directed to a method and apparatus for embedding a digitized code in a digitized audio product by dividing the digitized code into preselected portions, and representing the portions by a plurality of coding symbols, respectively. The spacing of the coding symbols from each other is determined to be used for embedding the digitized code within the audio product so that the spacing is greater than a predetermined minimum, and the coding symbols are inserted within the audio product based on the determined spacing.

One further aspect of the present invention is directed to a method and apparatus for decoding an audio product into which a code of digitized coding signals has been embedded by obtaining a digitized audio product and comparing the digitized audio product with a template of a coding signal to identify candidate coding signals based on shape. Pairs of sequential candidate coding signals are compared with each other based on preselected characteristics to identify which ones constitute the coding signals, and then reconstructing the code from the coding signals identified by the comparing step.

DETAILED DESCRIPTION OF THE PREFERRED EMBODIMENTS

Encoder

The invention includes an encoding technique for embedding alphanumeric codes in the sound waveform of a sampled audio product. This requires a modification of the sound waveform. However, the encoding technique is designed to render the modification inaudible in the sense that it cannot be discerned by a person with normal hearing. The encoding technique modifies only short portions of the sound waveform (the content of these modified portions is called a "symbol" which is used to form a code) and has no effect on the remaining waveform. Inaudibility of the symbols is achieved by careful selection of the symbol locations and the manner with which the code is inserted. The coding technique uses only a specific frequency band within the audio frequency range which has been selected to allow the embedded information to be recovered by a decoder (described below), even if the signal has passed through a low-quality transmission channel. The technique is also reasonably tolerant of frequency variations, such as produced by fluctuations in record/playback tape speeds.

Overview

Figure 1:
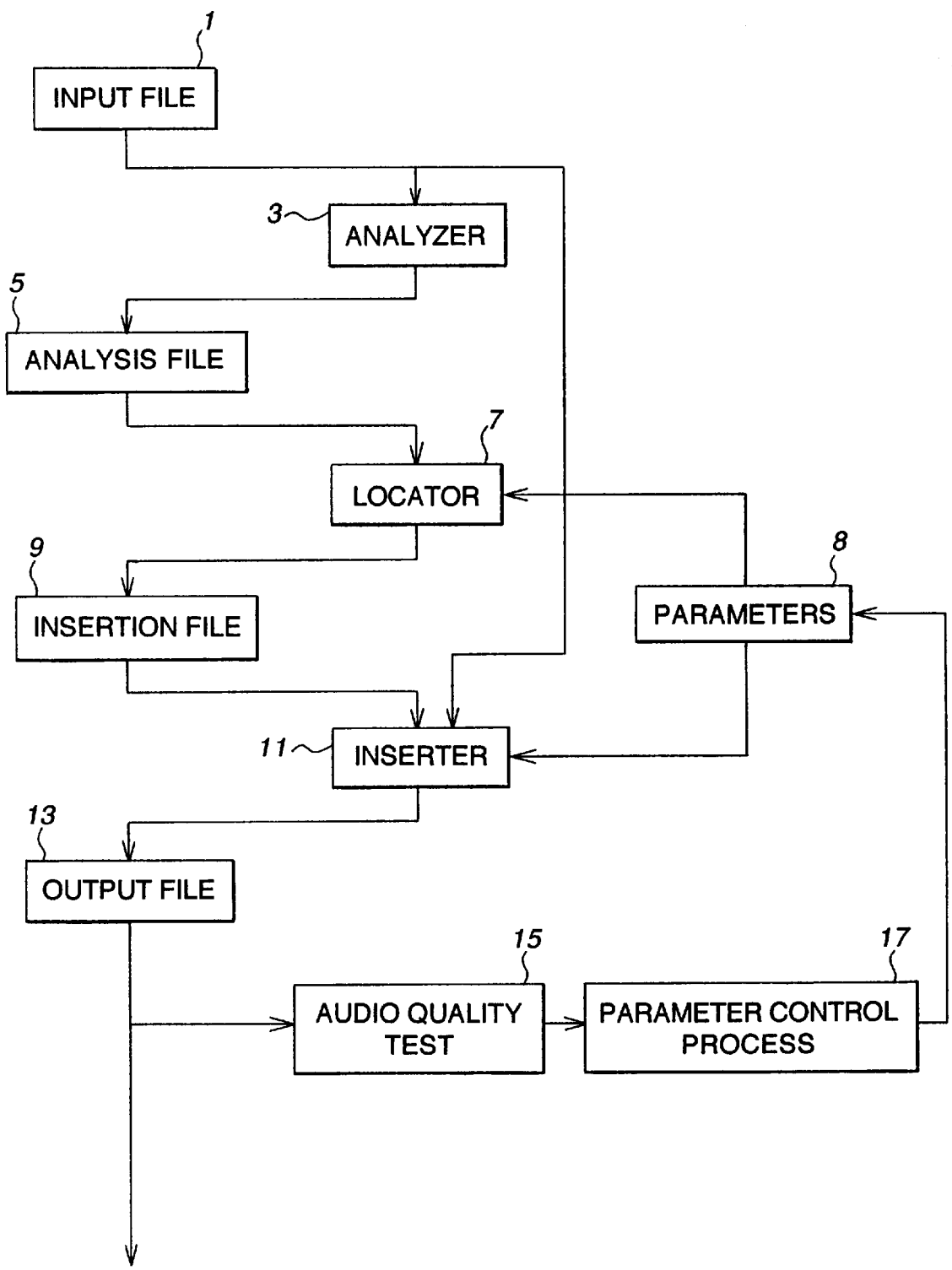
FIG. 1 is a general flow chart for the encoder of the invention.

A general description of the encoder of this invention is provided in relation to FIG. 1. The original sound waveform of the audio product is received as a serial stream of data and is stored into memory in the form of a digital audio Input File 1, e.g. in WAVE format (Multimedia programming interface and data specification No. V1.0 from IBM and Microsoft), which can be either mono or stereo. This is derived from a digital source of an audio signal or in a well known way by digitally sampling an analog audio signal. The sampling frequency is preferably either 44,100 samples/sec. or 48,000 samples/sec. The sampling frequency of 44,100 samples/sec. is the standard adopted for professional CD recordings and also by some radio stations. The sampling frequency of 48,000 samples/sec. is used by most radio stations and also is the standard adopted for digital TV. The encoded audio Output File 13 produced by the encoder is also stored in the form of a WAVE file.

The operation of the encoder is controlled by a number of selectable parameters 8. It may be necessary to change these parameters on occasion, for certain types of audio products. For example, audio products produced for the motion picture industry to be shown in theaters have a high dynamic range (e.g. 90 db) and high peak to average signal ratio, whereas the audio products produced for broadcast transmission have a reduced dynamic range (e.g. 40 db) and a low peak to average signal ratio. Each type requires parameter selection designed for optimal symbol insertion rates.

The encoder is preferably implemented to perform three separate functions which are called herein the Analyzer, Locator and Inserter functions. Referring to FIG. 1, the Analyzer 3 analyzes the Input File 1 and produces an intermediate file called Analysis File 5. This process of analysis is not affected by the selectable parameters 8. The Locator 7 reads the Analysis File 5 and decides exactly where and how the symbols should be inserted, so that they are psychoacoustically well masked by the audio product. This process is affected by receiving certain ones of parameters 8. A list of symbol description records is written to a file 9, called an Insertion File. The Inserter 11 reads the original Input File 1 and the Insertion File 9, and implements the symbol insertions described in the latter. This process is also affected by receiving certain ones of parameters 8. The resulting encoded audio is written to a WAVE format Output File 13.

In situations where the encoding needs to be tried repeatedly, with different values of the parameters, (such as for the adaptive masking described below or for verifying quality performance) the Analyzer 3 only needs to be run once, since its operation is not affected by the parameters 8. Since the Locator and the Inserter functions run faster than the Analyzer, this design allows such iterative insertion steps to be done efficiently and quickly.

The string of data signals constituting the code to be embedded is preferably a group of hexadecimal digits, each hexadecimal digit representing four bits, or two insertion symbols. The number of bits in the string must always be even. If the number is not a multiple of four, the last two bits are separated by a decimal point and expressed as a digit in the range 0.3. The order of symbol insertion is left to right in the string, and most significant to least significant within each digit. For instance, the string 75E8.2 corresponds to an 18-bit sequence as shown below in Table 1:

TABLE 1

| 7 | | 5 | | E | | 8 | | 2 |
|---|---|---|---|---|---|---|---|---|
| 01 | 11 | 01 | 01 | 11 | 10 | 10 | 00 | 10 |

A single '+' character can be appended to any string up to 64 bits long. This causes 14 extra bits to be internally calculated and appended to the code. These bits are check digits generated by a (n+7,n,5) BCH code in the $GF(2^2)$ (quaternary) field, where n is the number of supplied bit-pairs, up to 32. This code can correct up to 2 erroneous symbols and detect all 3-error cases. The generation of the check code involves effectively zero-padding the supplied bit string on the left to a full 64 bits, performing the check digit calculation on those bits, and then discarding the padding bits. In other words, the 14 check digits generated for the string "31E4+" are identical to those generated for "00000000000031E4+".

The Inserter receives data from both the Input File 1 and the Insertion File 9 in order to generate Output File 13.

The following table is a list of the parameters 8, supplied to run the Locator function 7 and Inserter function 11. The parameters are listed along with their default values. The meaning and utilization of these parameters is explained below.

TABLE 2

| Name | Units | Default | Description |
|---|---|---|---|
| MinEnv | Signal | 1200 ) | Control the Masking |
| MaxRatio | None | 300 ) | |
| MinRatio | None | 0 ) | |
| MaxSideRatio | None | 2.5 ) | |
| MinPingSpacing | Seconds | 0.1 ) | Control the Spacing |
| PingDither | Seconds | 0.025 ) | |
| PingSpacingAlpha | None | 1.3 ) | |
| PingSpacingBeta | None | 2.4 ) | |
| BandRemoveFac | None | 0.98 ) | Control the scaling and insertion of a ping. |
| PingGain | None | 0.4 ) | |
| PingGainMode | None | 1 ) | |

The encoder confines its operations to a frequency band of approximately 1000 Hz to 5000 Hz because it has the predominant amount of audio program energy content and is the least deteriorated by sending, playback and receiving. Thus, it is more robust in terms of resistance to distortion by various effects caused by the processing which the audio product must undergo, such as compression. Signal components outside this band are not affected by the encoding process, and are largely ignored by the signal analysis process of the Analyzer 3. This frequency band will be referred to as the "band of interest".

When a symbol is inserted, the sound waveform in the original audio product, in the band of interest only, is removed for a time period allotted for insertion of the symbol, called a symbol insertion period (used interchangeably herein with "segment"). The removal is not complete in the sense that some of the waveform of the original audio product is retained throughout this period, and the removal is implemented with a soft ramp at the beginning and end of the symbol insertion period. The removed audio is replaced by two, or sometimes three band-limited impulse functions, spaced at preselected intervals from each other. Data coding is performed by setting the polarity of these impulse functions. Each impulse function, called a 'ping', is an ideal mathematical impulse function to which a steep bandpass filter has been applied. The energy of the resulting waveform is confined to, and evenly spread across, the range of 1485 Hz to 3980 Hz.

Heard alone, these 'ping' symbols sound like a 'click' or 'pop'. The task of the Locator 7 is to find segments of the audio product in Input File 1 in the band of interest which are sufficiently spectrally rich (as defined below). When a ping waveform is added to such a segment, it sufficiently resembles the energy levels that were removed so that the modification is therefore difficult for a person to discern audibly. The magnitude of the inserted symbol is scaled to the RMS power of the in-band envelope signal in the symbol insertion period (the term "in-band" refers to the frequency range for the output signal of low pass filter step 20 in FIG. 2). This is done for two reasons: firstly, it helps provide a consistent 'replacement' power of the removed audio, to reduce the audibility. Secondly, the decoder (as described below) uses a normalization (or automatic gain) process which scales the signal it receives to provide a uniform RMS power level in the band of interest. By scaling the ping waveforms to the surrounding RMS, the encoder helps ensure that the ping waveforms appear in the decoder with a predictable amplitude, namely scaled to the amplitude of the surrounding audio. The ping symbols are sufficiently structured and unusual that they can be identified by the decoder with a high degree of accuracy within the surrounding audio, even after allowing for some distortion in the course of transmission.

The signal processing generally follows a model wherein a digitized signal is operated on by a signal processing function, the result being another digitized signal. This signal can then be passed to one or more further processing blocks. Generally speaking, a "signal" is a stream of 32-bit floating point numbers, or samples, representing the voltage on a hypothetical physical signal at equally spaced points in time. Due to the nature of the processing being performed, it is necessary to relate each output point to a specific time point in the Input File 1. In other words, all propagation delays through the signal paths need to be tracked very carefully. This is complicated by the fact that different signals have different sampling periods, and different signal processing elements have different delay characteristics. All sampling periods and delays are expressed in integral multiples of the "fundamental tick", or ftick. The ftick period is about 88.6 nsec. The exact value of this time period depends on the input file sample rate, as explained in detail below.

Analyzer

The Analyzer 3 generates two measurements of the input signal, namely the in-band envelope and the Tonality Ratio. The in-band envelope is a moving-average measure of the RMS power in the in-band signal. The Tonality Ratio is a figure indicating whether the in-band signal appears to be spectrally rich, i.e. having relatively uniform power throughout the band, or whether it is tonal, i.e. having a mix of high and low powers. Tonal signals do not mask clicks and pops well.

The envelope measurement is done via a series of signal processing stages as described below. The process is designed to produce a signal averaging envelope in a way which matches what will be done in the decoder for the same audio product, as explained in detail below.

Figure 2:
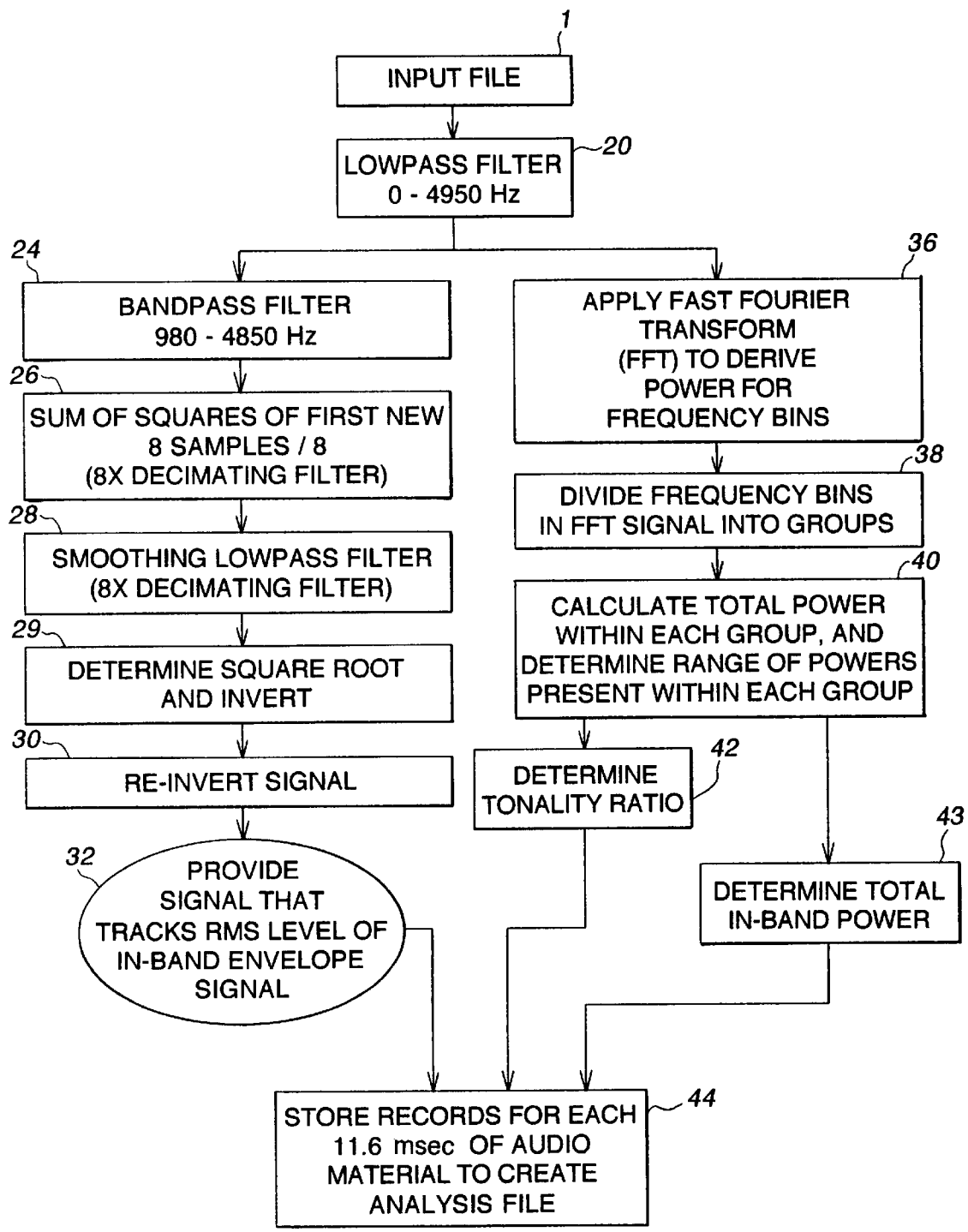
FIG. 2 is a flow chart for the Analyzer function.

As shown in FIG. 2, step 20 converts the signal from its sampling rate of 44100 or 48000 samples/sec. to a sampling rate close to 11025 samples/sec. All later processing is based on the latter signal. Step 20 also applies a low pass filter which removes all frequencies above about 4950 Hz so that they have no effect on the encoding process.

Proceeding to signal path 22 of FIG. 2, the 11025 samples/sec. signal is passed through a bandpass filter 24 with a frequency range of 980 Hz to 4850 Hz. Then, a power measurement process 26 reduces the sampling rate by a decimating factor of 8. Step 26 takes in eight samples from the bandpass signal outputted by step 24 and sums the squares of each sample, and divides the result by 8. One result is outputted for each eight input samples. An 8 times decimating and low-pass filter 28 is then applied for smoothing the output of step 26. Filter 28 is a 31 tap filter with the fixed coefficients set forth in Table 3.

TABLE 3

| OFFSET | VALUE | OFFSET | VALUE |
|---|---|---|---|
| 0 | 0.00364725799282 | 16 | 0.0610569733715 |
| 1 | 0.0071953136762 | 17 | 0.0596727757011 |
| 2 | 0.0112656333407 | 18 | 0.0574157779489 |
| 3 | 0.0157909231222 | 19 | 0.0543587323779 |
| 4 | 0.0206811320698 | 20 | 0.0505991154649 |
| 5 | 0.0258259243044 | 21 | 0.0462550106913 |
| 6 | 0.0310981949734 | 22 | 0.0414601700119 |
| 7 | 0.0363584938162 | 23 | 0.0363584938162 |
| 8 | 0.0414601700119 | 24 | 0.0310981949734 |
| 9 | 0.0462550106913 | 25 | 0.0258259243044 |
| 10 | 0.0505991154649 | 26 | 0.0206811320698 |
| 11 | 0.0543587323779 | 27 | 0.0157909231222 |
| 12 | 0.0574157779489 | 28 | 0.0112656333407 |
| 13 | 0.0596727757011 | 29 | 0.0071953136762 |

TABLE 3-continued

| OFFSET | VALUE | OFFSET | VALUE |
|---|---|---|---|
| 14 | 0.0610567733715 | 30 | 0.00364725799282 |
| 15 | 0.0615234375 | | |

The filtered result from the sum of the squares outputted by 26 and 28 is applied to step 29 which calculates the square root and inverts the signal. Step 30 re-inverts the signal generated by step 29 to produce the RMS in-band envelope signal 32. Signal 32 provides two envelope points for each of a plurality of periods of predesignated duration (e.g. symbol insertion periods), namely the RMS in-band envelope at the beginning and at the center of such period.

The resulting signal 32 tracks the RMS level of the in-band signal, with a slow response time to reflect the response of the human auditory system to perceived loudness variations. The Locator 7 will not insert symbols unless this envelope level is above a certain adjustable threshold. The principle is that quiet material is more likely to be corrupted by noise in the transmission channel and, therefore, does not provide a safe insertion point for a symbol.

Proceeding to signal path 34 in FIG. 2, the Tonality Ratio is measured via a Fourier-Transform process 36 which operates on the signal produced by the step 20. A 1024 samples FFT (Fast Fourier Transform) is used at spacings of 128 samples, on the time domain 11025 samples/sec. data, which provides a frequency resolution of about 11 Hz in the frequency domain. The resultant FFT signal is divided into 512 frequency bins. However, of these only the 320 central frequency bins are used, and these 320 bins are divided into 16 groups of 20 bins each, per step 38. In step 40, the total power is calculated within each group. Also, within each group, a measure of the range of power values present in the group is made. This measure is the ratio of the second-highest bin power divided by the second lowest. A weighted sum of these measures is made across all 16 groups, per step 42, using the individual group powers as weights. The result is the Tonality Ratio.

The Tonality Ratio tends to be higher for a tonal signal, i.e. which contains a mix of high and low bin power values within each group, and lower for spectrally rich signals, i.e. which have relatively uniform bin power across each group. Tests have shown that this measure tends to correlate very well with the sound's ability to mask the symbols. Symbols will be inserted in locations where the Tonality Ratio is lower than a preset adjustable limit (i.e., in a spectrally rich sound waveform). Also, the Tonality Ratios generated by the preceding and following symbol insertion periods from the FFT analysis operations are compared against a less restrictive limit (i.e., a higher preset limit) than the one used for the present symbol insertion period. This technique ensures that the symbols are well hidden, or masked, in the audio product.

Step 43 determines the total in-band power based on the FFT signal. In particular, as explained below, this total power is a summation of the in-group powers.

Thus, for Analyzer 3 as shown in FIG. 2, the input is at 48000 or 44100 samples/sec., and the output is a stream of records 44, which are stored in the Analysis File 5. Each record contains two envelope points, one Tonality Ratio value and one value of the total in-band power from the FFT which are interleaved for a single symbol insertion period.

Further details regarding the sampling rate will now be provided. The system handles different sample rates by sample-rate converting the Input File 1 to a common internal sample rate, which is always very close to 11025 samples/sec. The Output File 13 is always at the same rate as the Input File 1, allowing the output to be numerically identical to the input, except where symbol insertion is being done.

To simplify the handling of different sample rates, the ftick is defined. This is a time period whose exact value depends on the audio sample rate. Given $f_w$, the sample rate of the Input File 1, the value n is found, being the closest even integer to $11025.1024/f_w$.

The time period $1/nf_w$ is known as the ftick. This will always be close to 88.6 ns. The ftick is used as; the measure of time within the system. All sampled signals have periods which are multiples of the ftick. For instance, the low pass filter signal at the output of step 20 to which the input is sample-rate converted, has a period of 1024 fticks. Its sample rate will approximate 11025 samples/sec. to a few parts per thousand. The table below shows the rate of fticks, and the sample rate of the low pass filter for input rates of 44100 and 48000 samples/sec. which is the first signal after down-conversion. Most internal signals have rates equal to this, or decimated by a power of two.

TABLE 4

| Input Sample Rate | 44100 | 48000 |
| --- | --- | --- |
| n | 256 | 236 |
| Fundamental Tick Rate | 11289600 | 11328000 |
| Low pass filter (Step 20) | 11025 | 11062.5 |

The Analyzer has seven data members which are intermediate processing results. These members are described below.

TABLE 5

| Member | Sample Period (Fundamental ticks) | Description |
| --- | --- | --- |
| Input File 1 | 236 or 256 | Input signal (48000 or 44100 samples/sec.) |
| Step 20 | 1024 | Low-pass and sample-rate converted signal |
| Step 24 | 1024 | Signal after band-pass filter |
| Step 26 | 8192 | Signal after power measurement |
| Steps 28, 29 | 65536 | Signal after filtering of power measurement and inversion |
| Step 30 | 65536 | Signal after final filter and re-inversion |
| Step 36 | 65536 | Signal generated by FFT analysis |

Details of the steps in signal path 34 of FIG. 2 will now be provided.

To run the FFT operation of step 36, an FFT sample size of 1024 is read from the output of step 20 and a cosine (Von Hamm) window function is applied to the time domain data. An input pointer is moved by 128 samples after each FFT operation, so there is a substantial overlap between successive FFT operations. Each FFT operation performs the following function:

1. M real numbers are presented as a waveform to be transformed. M (i.e. 1024) is the FFT size used.

2. The time-domain window is applied to the waveform, the FFT is performed, and then the power for each of frequency bins from 0 to (M/2)-1 is calculated as the square of the magnitude of the complex FFT result. The resulting complex spectral image is simplified by retaining the square of the magnitude of each frequency bin and discarding the phase information.

3. M/2 real numbers are then retrieved. For M=1024, these are the power values for frequency bins 0 to 511.

This FFT operation can be described mathematically as $$F_f = \left( \sum_{t=0}^{N-1} w(t) x_t e^{2\pi j \frac{tf}{N}} \right) \left( \sum_{t=0}^{N-1} w(t) x_t e^{-2\pi j \frac{tf}{N}} \right), f = 0 \ldots \frac{M}{2} - 1$$

... where $x_t$ is the input waveform, M is the FFT size, w(t) is the window function, and $F_f$ is the magnitude-squared result. No scaling is performed so, for instance, the output in bin zero is the square of the sum of the M inputs (after windowing).

Each FFT result is, thus, obtained in the form of a power spectrum: A set of frequency bins, numbered from 0 to 511, containing the square of the magnitude of the complex FFT result for the corresponding frequency. The n-th bin contains information for a frequency of $$n \frac{11025}{1024} \text{ Hz} = n \cdot (10.77 \text{ Hz})$$

In accordance with step 38, the subset of this power spectrum corresponding to the band of interest is divided into groups. There are 16 groups, each having 20 frequency bins. The lowest group starts at frequency bin 96. Bins 0–95, as well as 437–511, are discarded. So these 16 groups cover the frequency range from about 1034 Hz to about 4470 Hz, each group covering about 215 Hz.

Within each group, the following three determinations are made in accordance with step 40:

The sum of the power values in each of the 20 bins (total group power)

The second smallest power value in the 20 bins

The second largest power value in the 20 bins.

Of course, the second smallest and second largest power values could be replaced by values of other bins, the main object being to discard the highest and lowest values as possible statistical aberrations. For each group, the second largest bin power is divided by the second smallest, and then the following non-linear clipping operation is performed: If the result exceeds 2000, then half the amount by which it exceeds 2000 is deducted. If the result of this operation exceeds 4000, then it is set to 4000. This provides a unitless measure of the power skew in the group. If the second smallest bin power is very small (as defined below in the equation for $T_i$), the power skew for the group is simply set to 4000 to avoid division by a very small number.

A weighted average is taken of the square roots of these ratios. The weighting value for each group is the total group power. The results provided by step 40 are squared and become the Tonality Ratio result for the whole FFT operation, as per step 42. It will always be at least one and no more than 4000. If $P_i$ is the total power obtained by summing the power of the bins in group i, and $B_i$ and $L_i$ are the second-largest and second-smallest bin powers, the calculation can be summarized as $$T' = \left(\frac{\sum_{i=0}^{15} P_i \sqrt{T_i}}{\sum_{i=0}^{15} P_i}\right)^2$$

... where T' is the overall Tonality Ratio.

There is also an RMS power calculation for the total in-band power which is derived from the FFT signal. The calculation of such total in-band power is as below:

$$P' = \sqrt{\frac{3}{8}} \sqrt{\frac{1}{1024} \sum_{i=0}^{15} P_i}$$

The division by 1024 corrects for power gain in the unscaled FFT operation, and the square root converts from a power measure to an RMS measure. The factor corrects for attenuation due to the cosine window. If the input is a sine wave of amplitude A, with a frequency in the band of interest, the resulting P' will be close to $$\frac{\sqrt{2}}{2} A$$

which is the correct RMS measure for a sine wave.

A data record 44 corresponds to information about the sound waveform of the audio product for a symbol insertion period, or about 11.6 msec of real-time for a 44,100 samples/sec. rate.

There are four data values in the record:

1. The in-band envelope level (from step 32) at the beginning of the 11.6 msec period. This is in signal units and is approximately equal to the R.M.S. value of the in-band signal. It is rounded and stored as an unsigned 16-bit integer.

2. The in-band envelope level (from step 32) at the center of the 11.6 msec period. Same units and scaling are used as for the first envelope point.

3. The Tonality Ratio (from step 42) for an FFT calculation centered about the beginning of the 11.6 msec period. This is a unitless number in the range 1–4000; it is scaled by $2^3$ and stored as a 16-bit unsigned number.

4. The total in-band power (from step 43) based on the FFT signal for a time period centered about the beginning of the 11.6 msec period. This is in signal units and is approximately equal to the R.M.S. value of the in-band signal. It is rounded and stored as an unsigned 16-bit integer.

Mathematical Background

The following description supplies the mathematical background underlying some processes used in the Analyzer 3. General methods are given for Sample Rate conversion, by a rational ratio less than unity;

Construction of a low-pass, linear phase FIR filter from arbitrary parameters;

Construction of a band-pass, linear phase FIR filter from arbitrary parameters;

A down-sampling process of step 20 converts; the Input File signal to the low pass filter signal, simultaneously reducing the sample rate by a rational factor and removing higher frequencies which cannot be represented in the lower sample-rate signal. The Input File 1 is resampled in such a way as to reduce the sample rate by a factor of K/V. K is the factor by which the original sample rate is multiplied. V is the decimation factor. It is assumed that K<V, but the same approach works for increasing the sample rate. The ratio must be in lowest terms; i.e. K and V have no divisors in common.

Conceptually, the signal is processed through the following individual steps:

1. The input signal is called $x_i$.

2. The rate of $y_i$ is increased by a factor of K, giving the signal $x'_i$. This is done by inserting K–1 zero samples after each sample:

$$x'_i = \begin{cases} x_{\frac{i}{k}} & i \text{ is a multiple of } K \\ 0 & \text{otherwise} \end{cases}$$

3. A low-pass FIR (Finite Impulse Response) filter with impulse response $F_k$ of length L.K is applied to this signal, giving the signal $y'_i$:

$$y'_i = \sum_{k=0}^{LK-1} F_k y'_{i-k}$$

4. The result is decimated by discarding all samples except those whose indices are a multiple of V, leaving the signal $y_i$:

$$Y_i = Y'_{iv}$$

These steps produce a rate-converted signal which is as close as possible to the mathematical ideal. The filter used in step 3 is ideally a 'brick-wall' low-pass which removes all frequencies too high to be represented at the new sample rate. Since an ideal filter has an infinite impulse response, the FIR can only approximate this ideal. A certain amount of signal aliasing will occur in step 4, which also arises because of the non-ideal FIR filter. Step 2 reduces the amplitude of the signal in the band of interest. This is compensated in step 3 by arranging the filter F to have a passband gain numerically equal to K.

The process described just above can be simplified by capitalizing on the fact that many of the $x'_i$ samples are zero and many of the $y'_i$ samples are discarded.

The FIR filter $F_k$ used in step 3 can be rearranged into matrix form:

$$G_{k,j} = F_{k+Kj} \quad \begin{array}{l} j = 0 \ldots L-1 \\ k = 0 \ldots K-1 \end{array}$$

so $$y'_i = \sum_{k=0}^{K-1} \sum_{j=0}^{L-1} G_{k,j} x'_{i-k-Kj}$$

$x'_i$ is zero except when i is a multiple of K, i.e. when (i–k–Kj)MOD K=0 in the equation above. An equivalent condition is k=i MOD K. Thus, the outer summation can be eliminated, using a single value for the index variable k:

$$y'_i = \sum_{j=o}^{L-1} G_{k,j} X'_i - k - Kj$$

where k=i MOD K.

With this definition of k, we have $$i - k = i - (i \operatorname{MOD} K) = \left\lfloor \frac{i}{k} \right\rfloor K$$

So, $$y'_i = \sum_{j=0}^{L-1} G_{k,j} x'_{(\lfloor \frac{i}{k} \rfloor - j)K}$$

where k=i MODK.
From the definition of $x'_i$, $$y'_i = \sum_{j=0}^{L-1} G_{(i\operatorname{MOD}k),j} x_{(\lfloor \frac{i}{K} \rfloor - j)}$$

and, from the definition of $Y_i$;

$$y'_i = \sum_{j=0}^{L-1} G_{(iV\operatorname{MOD}k),j} x_{(\lfloor \frac{iV}{K} \rfloor - j)}$$

This last equation performs the whole conversion in a single step. By substituting $$k_i = iV \operatorname{MOD} K$$

and $$q_i = \left\lfloor \frac{iV}{K} \right\rfloor$$

the last equation can be rewritten as $$y_i = \sum_{j=0}^{L-1} G_{k_i, j} X_{q_i - j}$$

Each summation operation is equivalent to applying a size L FIR filter to the input signal x starting at offset $q_i$. The coefficients of the FIR—its impulse response—are the row of G selected by $k_i$. Since the overall filter F has a gain of K, each row of G has a passband gain approximately equal to unity.

Assuming that the FIR is a symmetrical, zero phase low pass design, the delay incurred from signal $x'_i$ to $y'_i$ is (LK−1)/2 samples. The other conversions do not introduce delay, but they change the sample rates. The overall delay is input samples, or $$\frac{L - \frac{1}{K}}{2}$$

$$\frac{LK - 1}{2V}$$

output samples.

The rate conversion done on the input sample rate is a reduction by a factor of n/1024, where n is the number of fticks in the period of the input audio file. Thus, the conversion technique can be applied with $$K = \frac{n}{C}$$

$$V = \frac{1024}{C}$$

where C is the greatest common factor of 1024 and n. The delay, expressed in output samples is thus $$\frac{L \frac{n}{C} - 1}{2 \frac{1024}{C}}$$

or $$\frac{nL - C}{2 \cdot 1024};$$

In terms of fticks, the delay of the conversion process is (nL−C)/2 fticks. Since n is even, C will also be even, so this will be a whole number.

A generalized low-pass FIR filter with linear phase delay can be constructed using the general equation $$F_{i_{i=0...L-1}} = 2 \frac{f_c}{f_s} \operatorname{sinc}\left(2 \frac{f_c}{f_s}(i - i_0)\right) w(i, L)$$

where $$i_0 = \frac{L-1}{2}, \quad \operatorname{sinc}(x) = \frac{\sin(\pi x)}{\pi x}$$

L is the length of the filter, f is the sampling frequency, fc is the cutoff frequency, and w is a window function which applies over the range [OK L−1]. The Kaiser-Bessel window function $$w_k(i, L) = \frac{I_0\left(\beta \sqrt{1 - \left(\frac{2i+1}{L} - 1\right)^2}\right)}{I_0(\beta)}$$

is useful because the beta value can be adjusted to control the tradeoff between sharp cutoff and good out-of-band rejection for a given filter length. IO(x) is a modified Bessel function.

All frequencies are delayed ½(L−1) samples by such a filter.

It should be noted that sinc(x) needs to be evaluated as 1, or, more accurately, as 1−⅙(πx)², for values of x close to zero.

By multiplying the low-pass filter with the center frequency of the passband, a generalized band pass FIR filter can be realized as $$F_{i_{i=0...L-1}} = 2 \frac{f_w}{f_s} \operatorname{sinc}\left(\frac{f_w}{f_s}(i - i_0)\right) \cos\left(2\pi \frac{f_c}{f_s}(i - i_0)\right) w(i, L)$$

where $$i_0 = \frac{L-1}{2}, \quad \operatorname{sinc}(x) = \frac{\sin(\pi x)}{\pi x}$$

as before; L is the length of the filter, fs is the sampling frequency, fw is the width of the pass band, fc is the center frequency of the pass band, and w is a window function.

Locator

Figure 3:
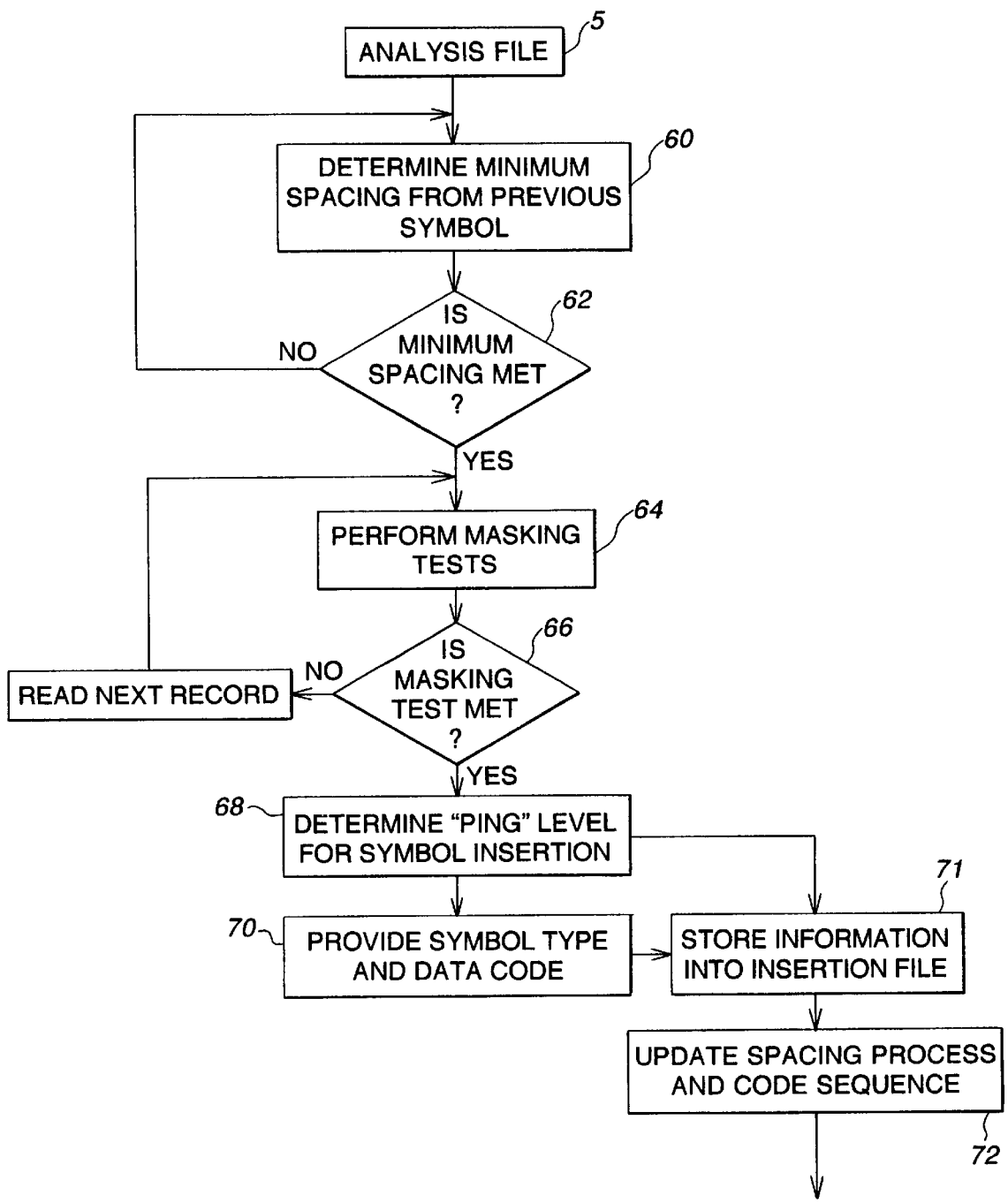
FIG. 3 is a flow chart of the Locator function.

As shown in FIG. 3, the Locator analyses records 44 from the Analysis File 5. As stated above, each record 44 contains information for about 11.6 msec of the audio product. The Locator reads every one of these records in sequence. As each record is read, a decision is made as to whether to insert a symbol at that point. The Locator is divided into three separate processes:

The Spacing process guarantees a minimum spacing between consecutive symbols, and prevents symbols from being inserted at regular intervals. This process does not examine the Input File characteristics.

The Masking Test process examines the signal characteristics at each possible insertion point, as determined by the spacing process, to determine whether a symbol inserted at that point would be masked well. This process does not consider the spacing between insertions.

The Code Sequencing process is responsible for sequencing the binary codes represented by the symbols. When a decision is made to insert a symbol, the Code Sequencing process determines the type of symbol to be inserted, as explained below, and the binary data it is to carry.

The spacing determination is made first to identify the minimum spacing for locating the next symbol. The masking test is not performed until a record 44 is reached for which this minimum spacing requirement is met.

Spacing Process

The ping spacing process of step 60 (FIG. 3) is controlled by the following four parameters:

MinPingSpacing (also referred to as "MPS"), expressed in seconds;

PingSpacingAlpha and PingSpacingBeta, unitless ratios; and

PingDither, expressed in seconds.

MinPingSpacing is the minimum time between symbol insertions. The other parameters combine to increase the minimum spacing in various ways. The earliest time the i-th symbol can be inserted is given by $$t_i \geq \text{Max} \begin{bmatrix} t_{i-1} + \text{MinPingSpacing} \\ t_{i-2} + \text{MinPingSpacing} \cdot (1 + \alpha) \\ t_{i-3} + \text{MinPingSpacing} \cdot (1 + \alpha + \beta) \end{bmatrix} + \text{PingDither} \cdot r_i$$

where $t_i$ is the insertion time of the i-th symbol $\alpha$=MinPingSpacingAlpha $\beta$=MinPingSpacingBeta $r_i$ is a random value uniformly distributed in [0,1]. Values of $t_i$, where i<0, are assumed to be zero. The $r_i$ random variable is generated each time a new symbol is inserted, and its effect is to ensure that the interval between symbols is random.

Typical audio products contain a continuous sequence of segments which are suitable for symbol insertion. This Spacing Process prevents rapid, regularly spaced insertion of symbols, since such are detectable to the ear because of their regularity. Selection of $\alpha$ and $\beta$ is made empirically by listening to their effect on audibility.

The following table has been derived for illustrative purposes only. The arbitrarily chosen parameter values are: MPS=3, $\alpha$=2 and $\beta$=1. For the sake of simplicity, $r_i$ is not into account in this example.

TABLE 6

| Symbol | $t_{i-1}$ + MPS | $t_{i-2}$ + MPS (1 + $\alpha$) | $t_{i-3}$ + MPS (1 + $\alpha$ + $\beta$) | Min $t_i$ based on Spacing Test | Actual $t_i$ based on Masking Test |
|---|---|---|---|---|---|
| 1 | — | — | — | — | 0 |
| 2 | 0 + 3 = 3 | — | — | 3 | 3 |
| 3 | 3 + 3 = 6 | 0 + 3 (3) = 9 | — | 9 | 12 |
| 4 | 12 + 3 = 15 | 3 + 3 (3) = 12 | 0 + 3 (4) = 12 | 15 | 16 |
| 5 | 16 + 3 = 19 | 12 + 3 (3) = 21 | 3 + 3 (4) = 15 | 21 | 23 |
| 6 | 23 + 3 = 26 | 16 + 3 (3) = 25 | 12 + 3 (4) = 24 | 26 | 26 |
| 7 | 26 + 3 = 29 | 23 + 3 (3) = 32 | 16 + 3 (4) = 28 | 32 | 32 |
| 8 | 32 + 3 = 35 | 26 + 3 (3) = 35 | 23 + 3 (4) = 35 | 35 | 35 |
| 9 | 35 + 3 = 38 | 32 + 3 (3) = 41 | 26 + 3 (4) = 38 | 41 | 46 |
| 10 | 46 + 3 = 49 | 35 + 3 (3) = 44 | 32 + 3 (4) = 44 | 49 | 50 |

Often used values for these parameters are: MPS=0.1 secs, $\alpha$=1.3 secs, $\beta$=2.4 secs.

If step 62 indicates that a particular record meets the minimum spacing requirement, then the masking test is performed on that record and all subsequent records until a symbol is inserted. Then the ping spacing process of step 60 is performed again in order for a new minimum spacing to be calculated and applied.

Masking Test Process

The Masking Test process 64 compares the signal characteristics for records obtained by step 62 from the Analysis File 5 against limits set by the encoder parameters 8. This process is controlled by the following parameters:

MinRatio and MaxRatio control the acceptable limits of the Tonality Ratio.

MaxSideRatio sets the acceptable maximum for the Tonality Ratio in adjacent measurements. The Locator has one frame of 'look-ahead', so it must read the next record before deciding whether to insert a symbol at the time corresponding to the present record.

MinEnv sets the minimum acceptable value of the signal envelope measurement.

MinEnv is in signal units; the others are unitless.

If the symbol $V_i$ represents the Tonality Ratio as retrieved by step 64 from the i-th record in the Analysis File 5, and $e_i$ is the in-band envelope estimate for the same point in time, then a symbol can be inserted at the corresponding time point if $$\left. \begin{array}{l} V_i \geq \text{MinRatio} \\ V_i \leq \text{MaxRatio} \\ V_{i-1} \leq \text{MaxRatio} \cdot \text{MaxSideRatio} \\ V_{i+1} \leq \text{MaxRatio} \cdot \text{MaxSideRatio} \\ e_i \geq \text{MinEnv} \end{array} \right\} \text{ are all true.}$$

"MinEnv" should be set with care; it needs to be adapted to the signal input level in use. If the signal input level is reduced by half, for instance (down 6 db), the encoder will perform fewer insertions. Dividing MinEnv in half will restore the original operation. The tonality measurements are not affected by the input level.

As discussed above, each record 44 has two in-band envelope levels. Both levels must meet the above-stated threshold for $e_i$.

The purpose of MinEnv is to prevent the encoder from inserting symbols into portions of the audio product which are so quiet that they may be overwhelmed by noise in the transmission channel.

The other conditions ensure that the proposed insertion site, and the surrounding area of the signal, are sufficiently non-tonal or have sufficient psychoacoustics to mask the symbol well.

MaxSideRatio ("MSR") is expressed as a ratio relative to MaxRatio ("MR"). Normally MSR/MR is >1.

The closer the Tonality Ratio approaches 1, the more spectrally rich (in the sense of having substantially uniform power in the band of interest) is the audio product. MinRatio establishes the noise floor for symbol insertion. If a segment is extremely noisy and is then subjected to noise reduction or removal systems, symbols inserted into such a noisy segment could be removed and lost through the same process. By defining the MinRatio for Tonality, it can be ensured that symbols are acted upon as "real" audio and therefore enhance recovery by the decoder.

Additional, more extensive, well known masking parameters can be added which use the signal characteristics data obtained from the Analysis file 5 to define temporal masking values of the bandpass signal. This more elaborate type of masking test employs more precise psychoacoustic masking effects of the signal immediately around the symbol insertion time segment.

If the masking test is met, as determined by step 66, then step 68 of FIG. 3 is responsible for determining the RMS level of the "ping" waveforms required for symbol insertion. This level is calculated based on the parameters PingGain and PingGainMode from among parameters 8:

If PingGainMode is 1, the insertion level is PingGain times the in-band envelope level at the insertion time (i.e. output of step 32).

If PingGainMode is 2, the insertion level is PingGain times the total in-band power as estimated by the Fourier Transform at the insertion time (i.e. output of step 43).

The total in-band power as estimated by the FFT at the time of insertion with step 43, is a more accurate measure of the power of the audio signal than that of the more averaged envelope level outputted by step 32. This higher degree of accuracy is required as more precise psychoacoustic masking decisions are used. This allows for careful control of the amplitude of inserted symbols so that codes are less likely to be lost when psychoacoustic compression systems are used in the audio delivery chains.

The value of PingGain is set empirically based on tests of program types and signal characteristics.

Code Sequencing

The encoder can insert any binary code, any even number of bits in length. Each symbol carries two bits, except for the start and end symbols.

The codeword to be encoded, 2n bits in length, is broken up into n 2-bit sections, referred to as "dits" (for double-bits). The codeword is then encoded using A start symbol, which serves to mark the start of the codeword, but carries no information. This also establishes a reference in the receiver, indicating whether the channel has inverted the signal.

n-1 data symbols, which encode 2 bits each;

An end symbol, which encodes the last 2 bits of the codeword and also serves to mark the end of the codeword with the addition of a conditional ping.

The start and end symbols are each coded as 3-ping symbols, while the data symbol is a 2-ping symbol. The start symbol is coded by the bit pattern '000', meaning three negative pings. The two pings in a data symbol are coded according to the two bits being encoded. In an end symbol, the first two pings are encoded according to the data, and the third ping is the inverse of the second ping of the symbol.

The table below shows an example where the 12-bit sequence '0110 1100 1110' is encoded with seven symbols:

TABLE 7

| Bits Coded | Ping Polarities | Symbol Type |
| --- | --- | --- |
| 000 | - - - | Start |
| 01 01 | - + | Data |
| 10 10 | + - | Data |
| 11 11 | + + | Data |
| 00 00 | - - | Data |
| 11 11 | + + | Data |
| 10 101 | + - + | End |

Thus, in step 70 of FIG. 3, the data string of code sequencing determines the present position reached in the code to be embedded during the embedding operation of the encoder, as shown above in Table 1. If the operation is at the beginning of such code, then step 70 will provide the start symbol for insertion. Likewise, if a data bit is to be encoded, as per the table presented above, the corresponding code symbol type and code will provided. Step 71 stores into Insertion File 9 the symbol type and data code received from step 70 as well as the ping level from step 68. This is stored in association with a particular segment of, or location in, the sound waveform of the audio product.

When specified conditions for symbol insertion have been met and a symbol is to be inserted, step 72 causes the spacing process and code sequencing to be updated.

Inserter

The Inserter 11 reads the Input File 1 and writes a new WAVE audio file which is identical to the Input File 1, except for short sections which are modified by symbol insertions made according to the information in the Insertion File 9.

The Insertion File 9 provides the following information for each symbol:

Insertion time (given in fticks)

Insertion Gain (as an R.M.S. level)

Symbol type, and data bits to be coded.

The Output File 13 must always have the same sample rate and format as the Input File 1; e.g. if the Input File is 16-bit stereo at 48000 samples/sec., then the Output File has the same characteristics.

A symbol is inserted into the original audio product by the two processes, Band Removal and Ping Addition, described in detail below. The nominal insertion time is the midpoint of the area in which the insertion is performed.

Band Removal

Figure 4:
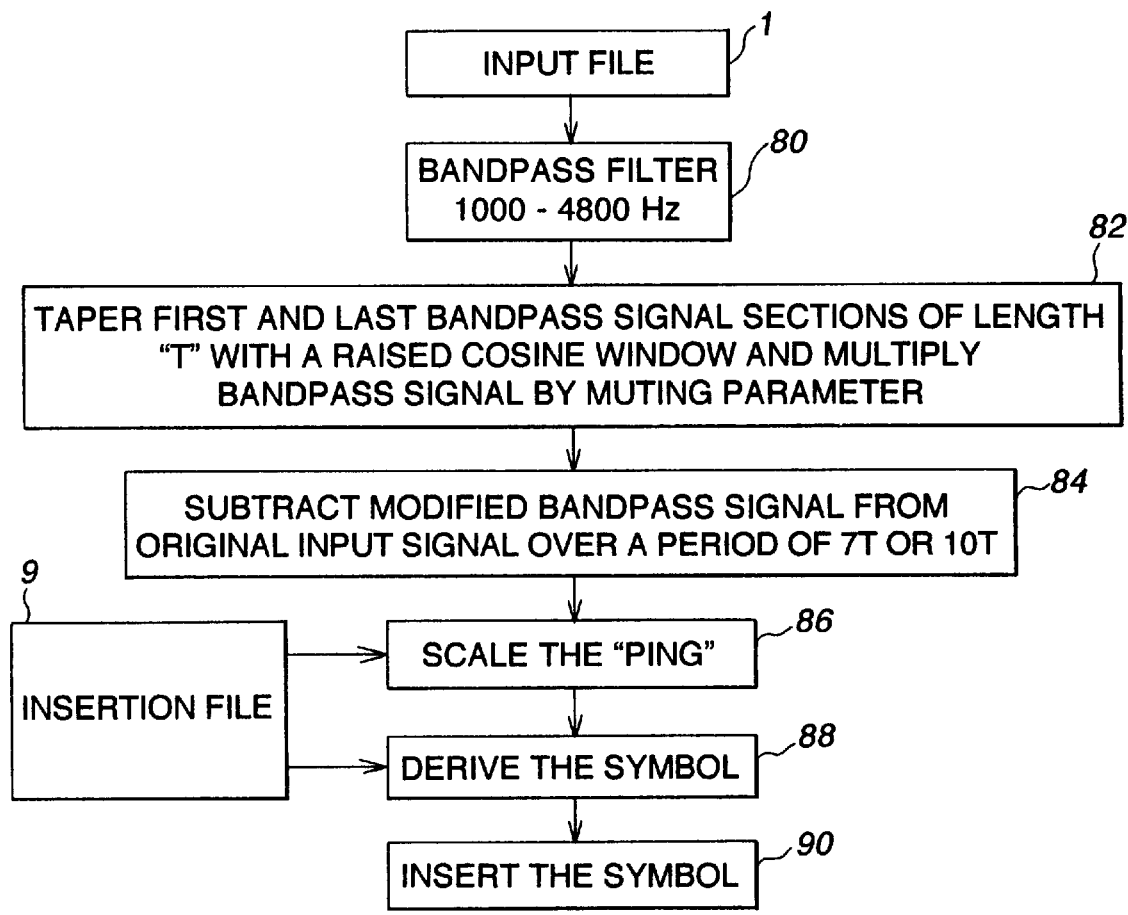
FIG. 4 is a flow chart of the Inserter function.

As shown in FIG. 4, a bandpass signal is derived by applying a bandpass FIR filter to the original signal from Input File 1 to remove frequencies outside the range 1000–4800 Hz approximately. This is done per step 80 by using a symmetrical, effectively non-causal filter with zero phase response. This filter requires (N−1)/2 samples before and after the modified section of the signal where N is the filter length, which is odd.

Figure 5:
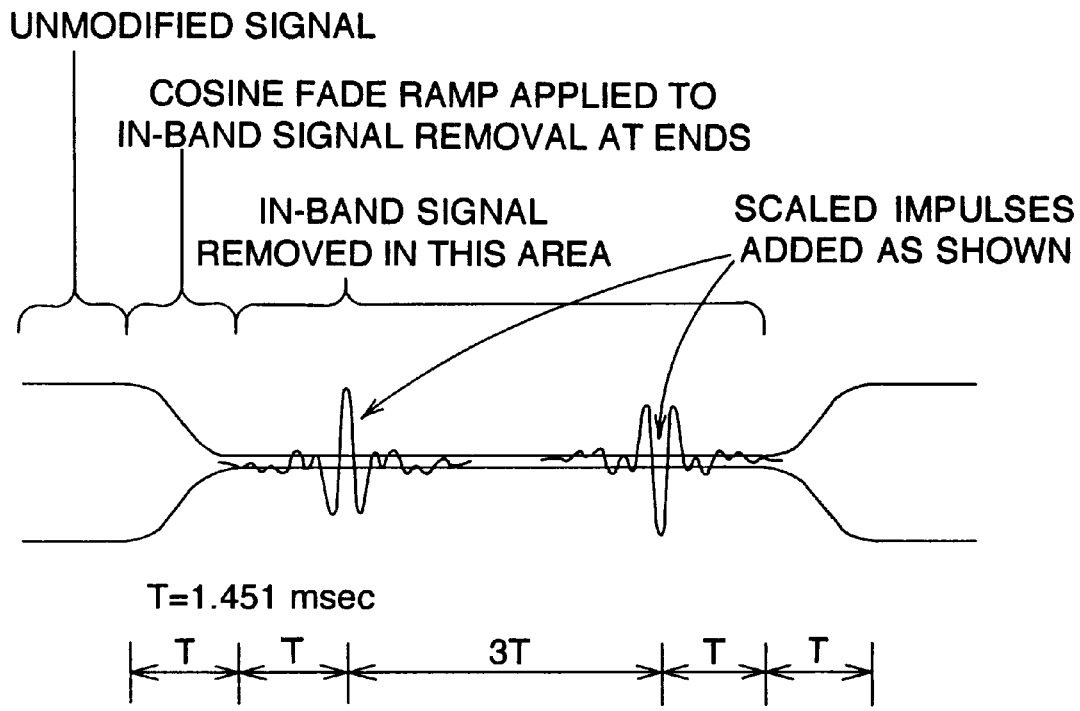
FIG. 5 is a graph of the 2 ping symbol frame.
Figure 6:
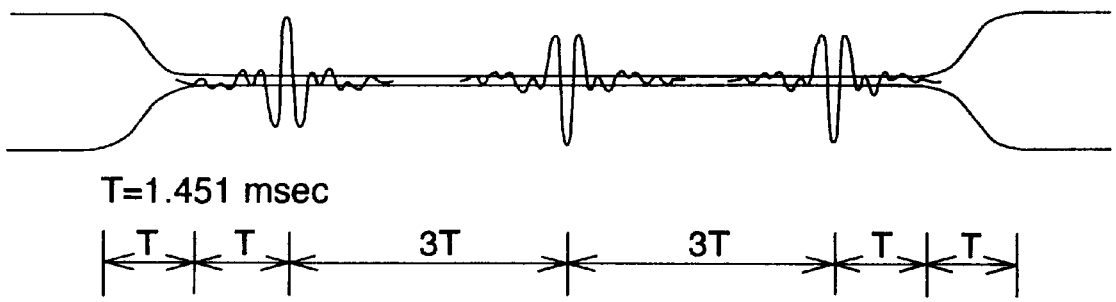
FIG. 6 is a graph of the 3 ping symbol frame.

In step 84, a modified bandpass signal derived by step 82 (as explained below) is subtracted from the original signal over a period of 7T or 10T. Each "T" is 256 samples at 44100 samples/sec., or about 1.451 msec. As shown in FIGS. 5 and 6, a 2-ping symbol occupies 5T and a 3-ping symbol occupies 8T. The duration of signal represented by a record 44 is 8T, or 11.6 msec.

In step 82, first and last sections of the bandpass signal, of length "T" each, are tapered with a raised cosine window.

The windowing operation ensures that no transients are introduced into the signal. Thus, as shown in FIGS. 5 and 6, 7T is used for the 2-ping symbol (i.e. for data type) and the 10T is used for the 3-ping symbol (i.e. for start type and end type). Also, the bandpass signal is multiplied by BandRemoveFac, an empirically set parameter that is one of parameters 8, which is just less than 1. This causes the in-band signal to be almost entirely removed in the symbol insertion segment. The retention of some contextual component of the audio product has been empirically determined to have a psychoacoustic advantage in masking the removal of the audio and the insertion of the symbol. The retained components should be in the range of 2%–5% of the amplitude of the audio product in the symbol insertion segment.

Ping Addition

Once the band-removal is completed, a fixed 'ping' waveform is scaled per step 86, the symbol is derived per step 88 and inserted per step 90 in the signal. Two or three pings (depending on the symbol type) are spaced 3T apart from each other and centered in the segment from which the band was removed.

Scaling of the ping in step 86 is based on two factors:

1. Polarity: '0' bits have negative polarity, while '1' bits have positive polarity. This information is obtained from Insertion File 9. The start symbol establishes a reference in case the process of transmission and reception inverts the signal.

2. Magnitude: This is calculated based on PingGainMode using the total in-band power or the in-band envelope in the symbol insertion area, as per step 68 described above, to mask the audibility of the ping while maintaining its recoverability. The magnitude is given as an RMS level, averaged across a 3T period centered on the ping, and it is obtained from Insertion File 9.

Step 88 derives the symbol from the symbol type and data code information stored in Insertion File 9, and based on the scaled ping outputted by step 86. The result is inputted to step 90 which proceeds to perform the actual insertion, or embedding, of the symbol.

FIGS. 5 and 6 show a 2-ping symbol and a 3-ping symbol, respectively. The ping waveform is derived from a template which has a width of 4T. However, it is almost zero outside the 2T center area, as shown. The ping waveform template will be discussed below in further detail.

Bandpass Filter

This filter is used for step 80. It is constructed using the method given above in the Mathematical Background section, with parameters as follows:

Passband from 950 Hz to 4850 Hz

Kaiser Window with parameter of 7

FIR Length: 7.78 msec. This is converted to a number of samples at the current sample rate. The result is rounded to the nearest integer. If the result is even, one is subtracted.

Cosine Window Template

The template for the cosine window of step 82 has for its length a number of samples equivalent to T (1.451 msec), regardless of sample rate. Thus, the number of samples varies with the sample rate. The template fades from 0 to 1 based on the relationship $$\text{Template}_i = \frac{1}{2}\left(1 - \cos\left(\frac{\pi i + \frac{1}{2}}{\text{TempLength}}\right)\right)$$

The template is used to fade the beginning and end of the band removal process.

Ping Waveform

This is constructed as a bandpass FIR filter, using the method given above in the Mathematical Background section, with parameters as follows:

Passband from 1485 Hz to 3980 Hz

Kaiser Window with parameter of 8.5

FIR Length: 5.804 msec. This is converted to a number of samples at the current sample rate. The result is rounded to the nearest integer. If the result is even, one is subtracted.

The resulting array of samples is scaled so that it has an R.M.S. power of 1, average over the middle "3T" (4.353 msec) portion of the WAVE file.

Filter Plots

Frequency-domain and time-domain response plots for the three linear filters used in the system will now be described.

The frequency response plots are in decibels against Hz. All of the filters are symmetrical linear phase FIR filters, meaning that they delay all frequencies equally, so no phase response is shown. The time-domain plots are impulse response waveforms. These show the output from the filter, for an input consisting of a single input sample of value '1' at t=0, all other input samples being zero. The time scale is in milliseconds for all plots.

Figure 7:
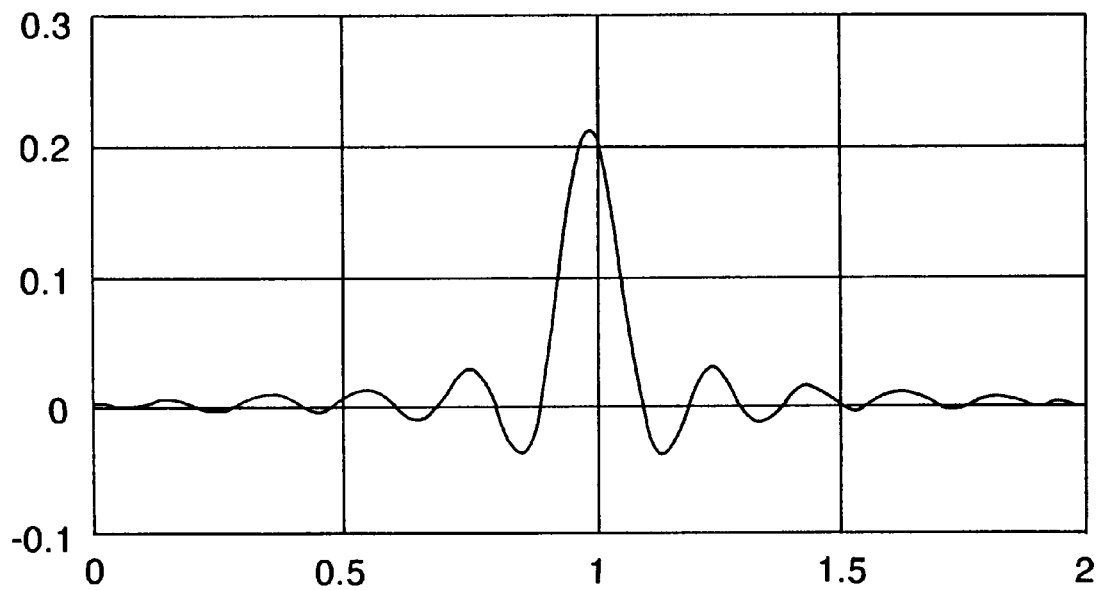
FIG. 7 is a low pass filter impulse response for a filter such as is used for the Analyzer.
Figure 8:
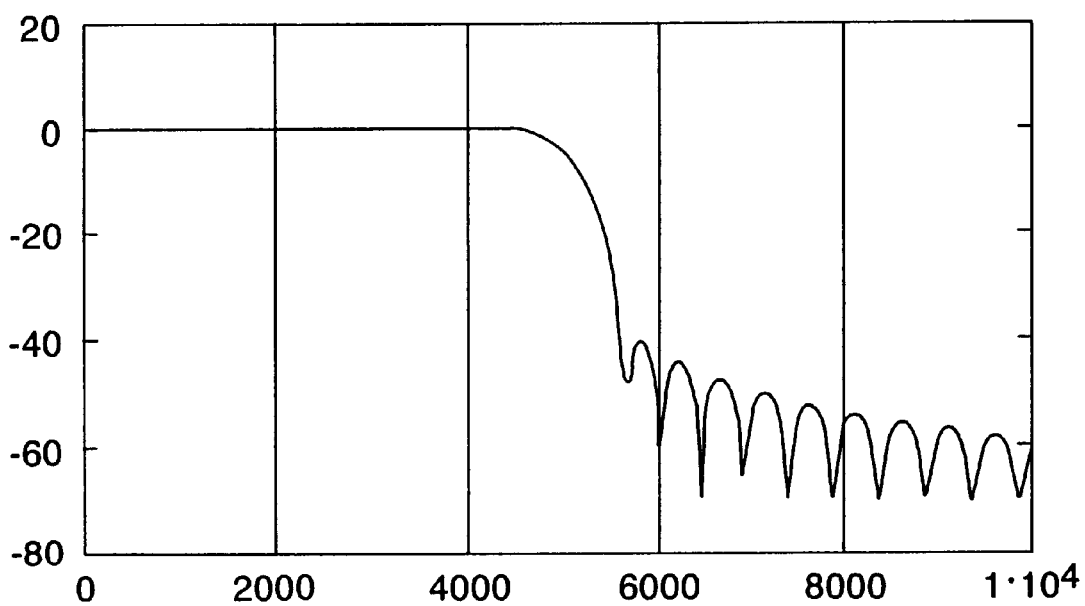
FIG. 8 is a low pass filter frequency response for the filter of FIG. 7.

FIG. 7 shows the time domain response of the filter which is applied to the input signal before rate conversion (see step 20). It removes frequencies which cannot be represented at a sample rate of 11025. FIG. 8 shows the frequency response of the same filter.

Figure 9:
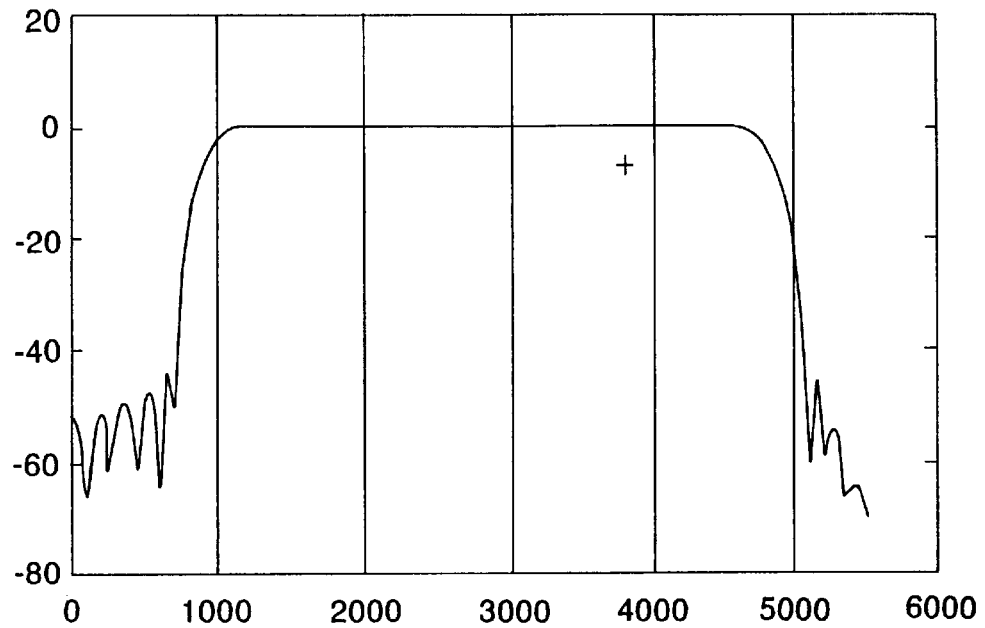
FIG. 9 is a bandpass filter frequency response for a filter such as is used for the Analyzer.
Figure 10:
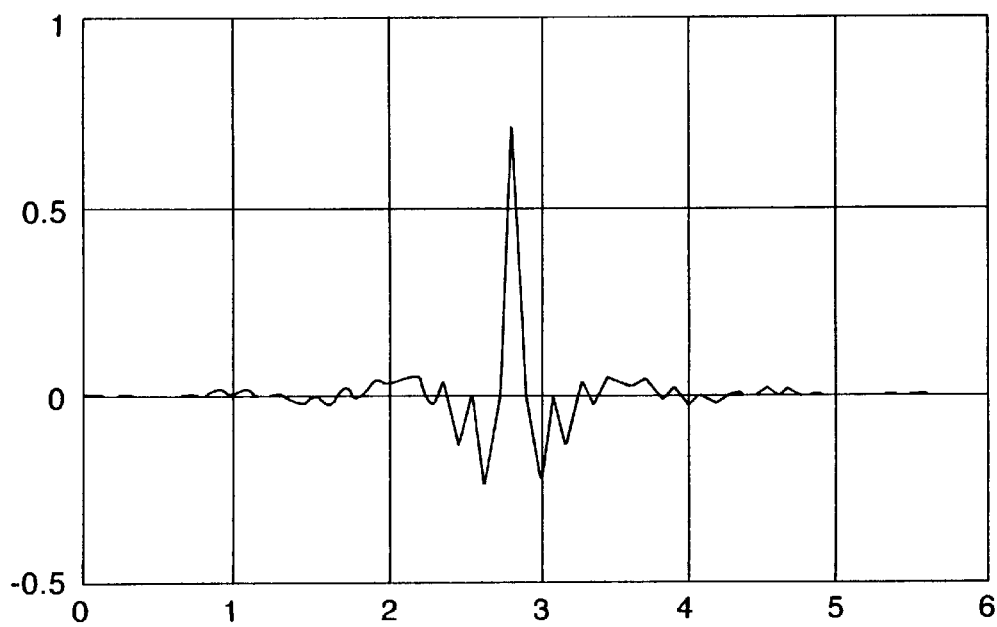
FIG. 10 is a bandpass filter impulse response for the filter of FIG. 9.

The bandpass filter of step 24 is used in the beginning of the signal path 22 to extract the band of interest. FIGS. 9 and 10 show its frequency response and time domain response, respectively.

Figure 11:
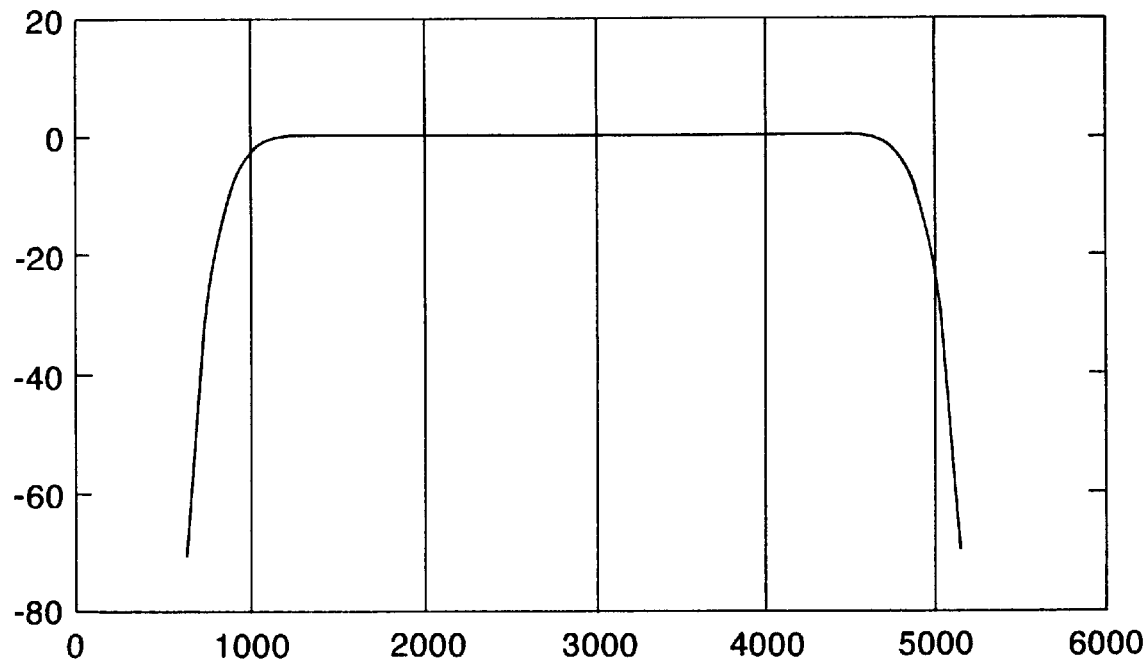
FIG. 11 is a band pass filter frequency response for a filter such as is used for the Inserter.
Figure 12:
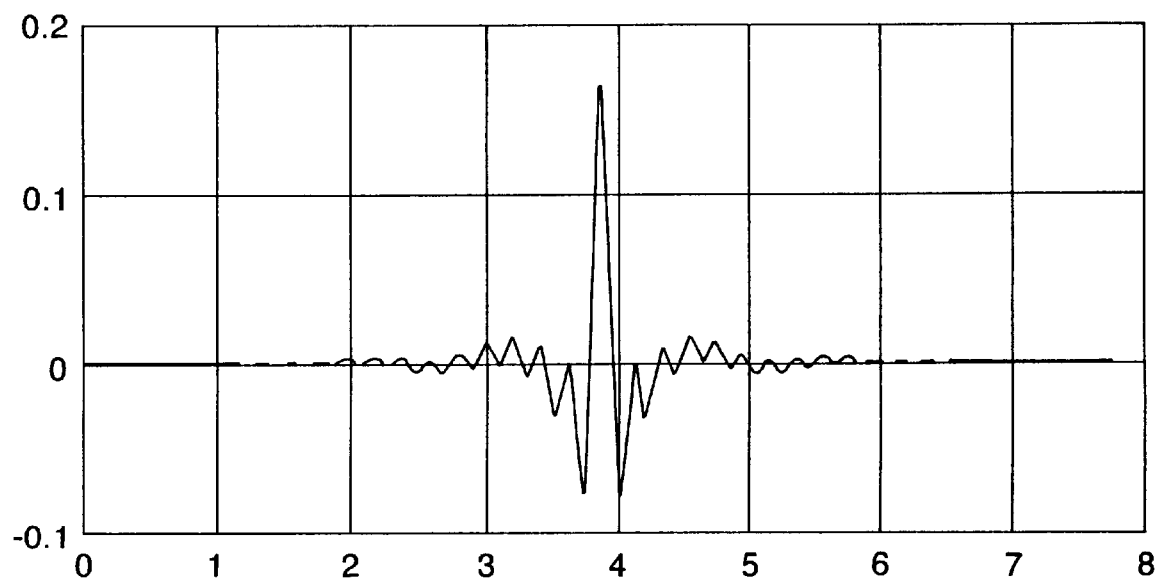
FIG. 12 is a band pass filter impulse response for the filter of FIG. 11.

The bandpass filter of step 80 is used in the Locator to remove the portion of the signal in the band of interest. FIGS. 11 and 12 show its frequency response and time domain response, respectively. The length of the filter, as a number of taps, depends on the sample rate. The plots are for 48000 Hz. The shape of the graphs will change only slightly for other sample rates.

Ping Waveform

Figure 13:
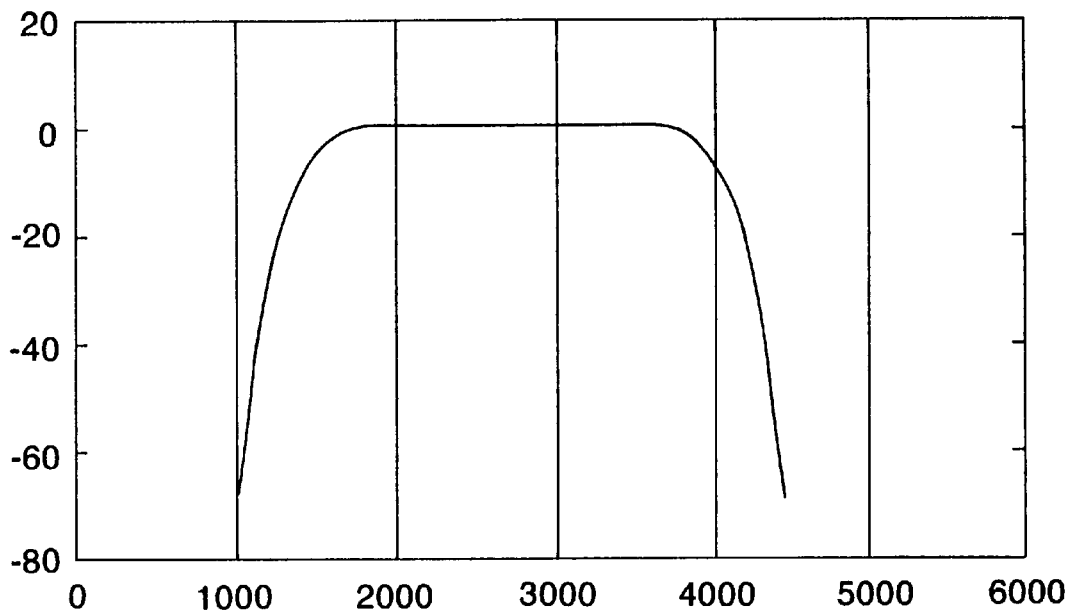
FIG. 13 is a ping waveform spectral content.
Figure 14:
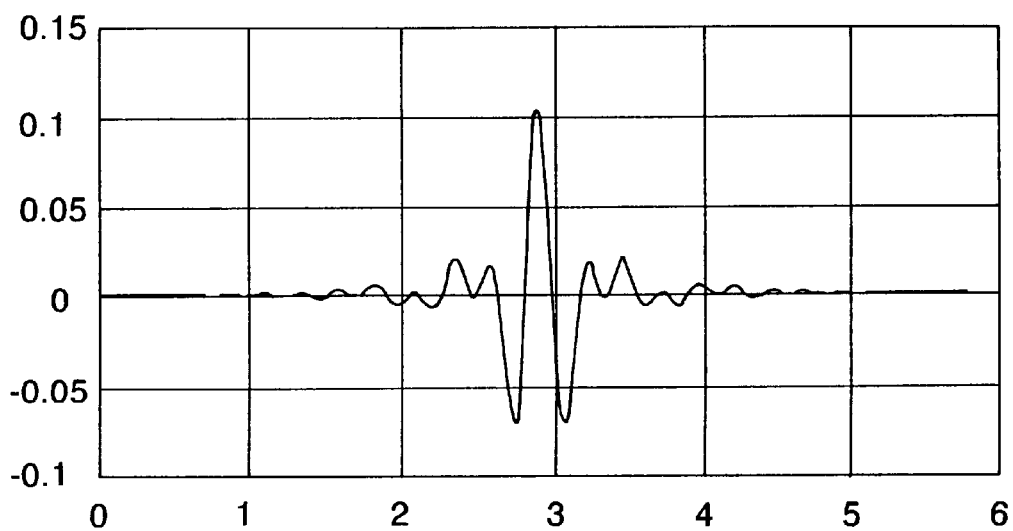
FIG. 14 is a ping waveform, time domain.

FIGS. 13 and 14 show a signal template for the ping waveform which is used in the insertion process. It is related to the filter response plots of FIGS. 7–12 because band-pass filter design techniques are used to generate the ping waveform. Its band-limited spectral content is important to the invention because it must be within the bounds of the bandpass filter techniques described herein for creation and detection of the code. The Ping Waveform Spectral Content is shown in FIG. 13. The Ping Waveform Time Domain is shown in FIG. 14.

Adaptive Masking

Another important feature will now be explained in connection with FIG. 1. The data in Output File 13 generates audio sound, when reproduced through suitable equipment, which is used by step 15 of FIG. 1 to perform a subjective audio quality test based on psychoacoustic factors. Thus, testing process 15 could involve a group of human test subjects who listen to the audio and provide a descriptive feedback of audio quality, such as "I hear popping noises" or "I hear dropouts". The severity of each quality impairment is also ascertained on a scale of, say, 1 to 5 with 5 being the worst.

Based on the derived feedback information of (1) the nature of the impairment and (2) its severity, a decision is made by step 17 regarding whether and how parameters 8 are to be modified. One embodiment of parameter control process 17 relies on a human operator who utilizes the feedback information and a set of empirically derived rules for modifying parameters 8. As an example of such rules, for popping noises assigned a value of 3 on the scale of 1 to 5, the PingGain is reduced by 10%.

Another embodiment automates process 17 by developing a lookup table using the feedback information from step 17 as inputs. Step 17 then outputs control signals to suitably vary the parameters 8.

The modified parameters 8 are used to embed the code as Locator 7 and Inserter 11 are performed once again to derive a new Output File 13. Test 15 and process 17 can continue to be applied iteratively for modifying parameters 8 until an Output File 13 is derived which generates audio that satisfies the assigned audio quality requirements.

Decoder

The decoder processes digital information derived from a received audio signal, including a waveform with an embedded code, typically it is picked up from an RF receiver. The analog signal is digitized to derive a Decoder Input File in WAVE format, comparable to Input File 1.

Figure 15:
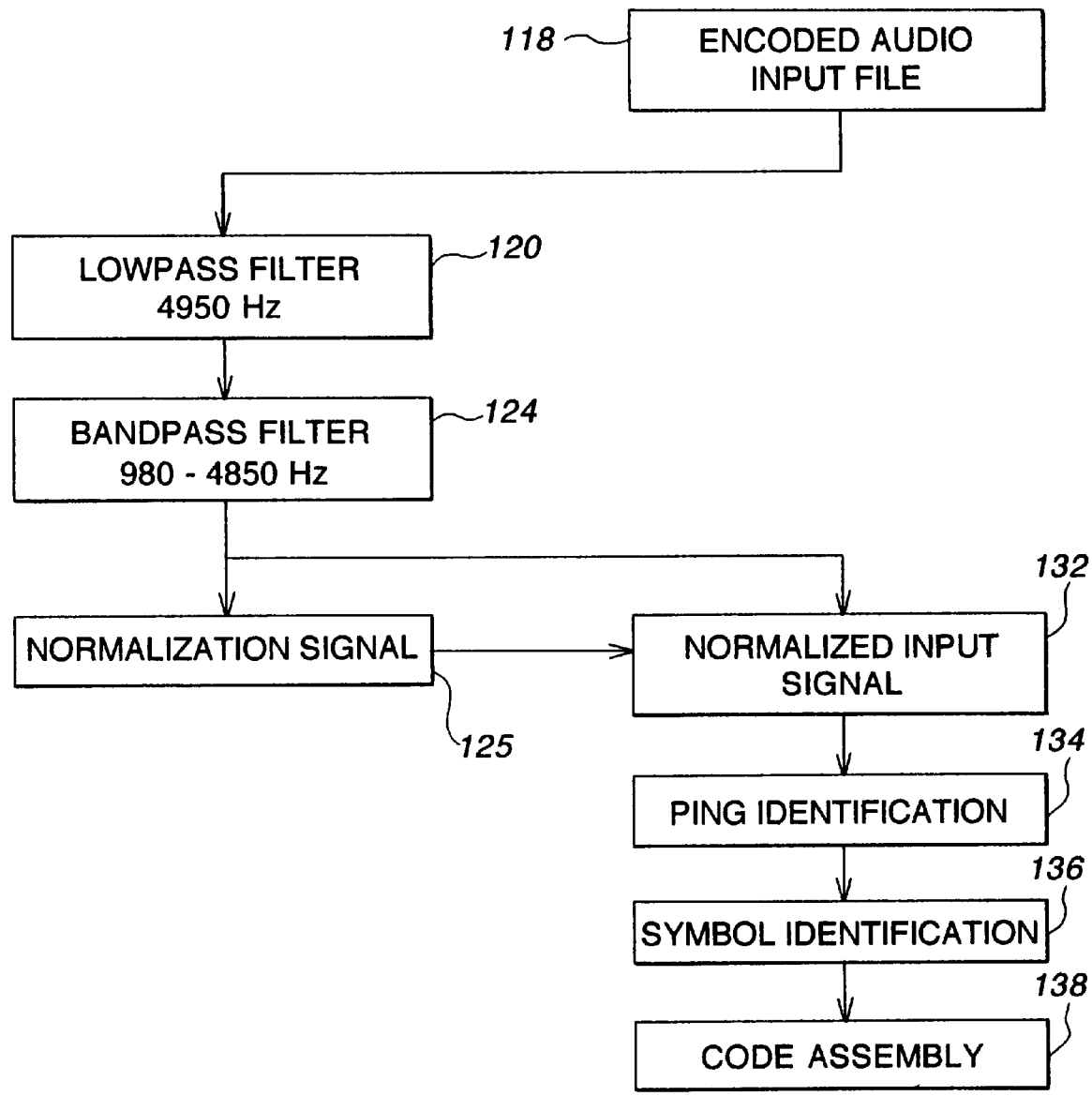
FIG. 15 is a general flow chart for the decoder of the invention.
Figure 16:
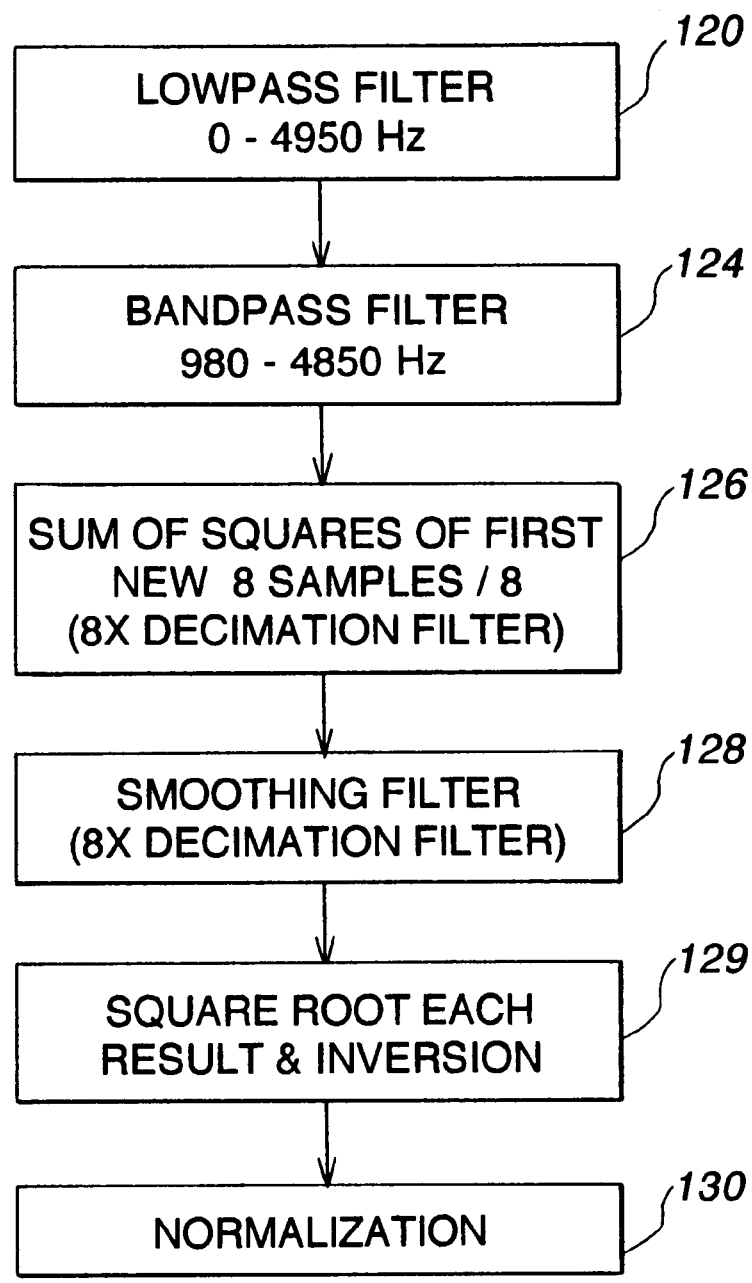
FIG. 16 is a flow chart for the filtering and normalization functions of the decoder.

As shown in FIG. 15, the Encoded Audio Input File 118 is processed by step 120 which is analogous to step 20 of FIG. 2. Step 124 of FIG. 16 is analogous to step 24 to provide a bandpass filter output. Operation 125 provides signal normalization, as explained below, and a normalized input signal is outputted by step 132.

Ping identification is performed by step 134, which isolates candidate pings from the band-limited, power-normalized signal. Each candidate ping is associated with a time point and an amplitude, both of which are determined via a template correlation process, as explained below.

In symbol identification step 136, the sequence of pings, identified in the first stage are examined to find pairs of pings, each pair of which forms a symbol. This is necessary because "false" pings occur with some regularity in the audio product source material itself. The decoder detects symbols by looking for pairs of pings with the correct relationship to each other. Once the symbols are identified, code assembly step 138 then reconstitutes the embedded code detected in the audio signal.

Normalization operation 125 includes the various steps shown in FIG. 16. These are designed to match steps 26–30 of FIG. 2 so that the signals outputted by the encoder and processed by the decoder are matched as well. More specifically, step 126 is comparable to step 26. Step 128 is comparable to step 28. Step 129 is comparable to step 29. However, step 130 differs from step 30 in that step 30 includes inversion, but step 130 does not. Therefore, the signal from step 130 is the inverse of the output from step 30. This inversion by the decoder constitutes an amplitude normalization which removes variations due to gain or attenuation experienced during sending, playback and receiving operations for the audio product.

Details of steps 134, 136 and 138 will now be provided.

Figure 17:
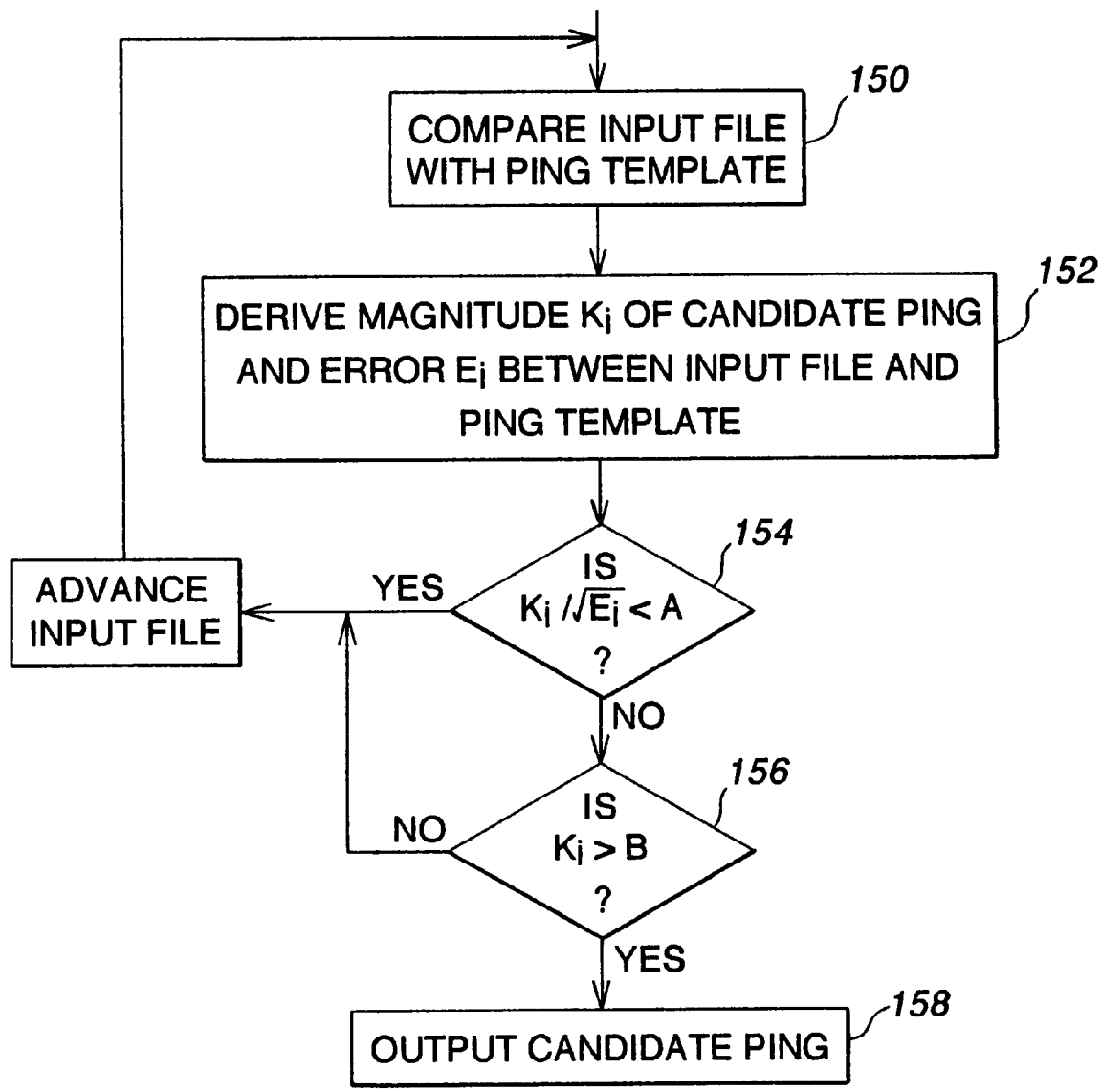
FIG. 17 is a flow chart for the ping identification function.

Ping Identification step 134 is shown in detail by FIG. 17. It compares the normalized input signal derived by step 132 with a ping waveform template, as per step 150 in FIG. 17. Details of this template have been provided above. A circulating buffer stores as many samples of the normalized input signal as there are data samples in the ping waveform template. Each sample of the input signal is compared with its respective template data sample. The RMS error for each sample comparison is calculated to derive an error function $E_i$ and an overall scaling factor $K_i$ per step 152, as described below.

The comparison algorithm finds the value of $k_i$ which minimizes the error function $$E_i = \sum_j (k_i t_j - x_{i+j})^2$$

where $t_j$ is the fixed template and $x_{i+j}$ is the normalized input signal being analyzed. This can be expanded as $$E_i = k_i^2 \sum_j t_j^2 - 2K_i \sum_j t_j x_{i+j} + \sum_j x_{i+j}^2$$

This is minimized by setting the derivative with respect to $K_i$ to zero, resulting in:

$$k_i = \frac{\sum_j t_j x_{i+j}}{\sum_j t_j^2}$$

Since $t_j$ is a fixed template, the denominator in the above is a constant which can be pre-calculated. Calculation of $$\sum_j t_j x_{i+j}$$

allows $k_i$ to be calculated. The polarity of $K_i$ determines the polarity of the received ping. Additionally, calculation of $$\sum_j x_{i+j}^2$$

allows $E_i$ to be found.

The decoder performs this comparison to search for pings on an 11025 Hz signal. The search is actually done to a resolution of 44100 Hz. This is done by using four separate templates (representing ¼-sample shifts of the ideal ping template relative to 11025 Hz). At each iteration, the template with the largest $$\sum_j t_j x_{i+j}$$

and, thus, the largest k and lowest E, is found. This provides a higher position resolution for locating pings, and a more accurate measurement of the ping's magnitude and closeness of match.

Thus, the calculated value of $K_i$ minimizes the error $E_i$ between the input signal and the ping template. That same value of $K_i$ is used to scale the magnitude of the ping template, and $K_i$ is regarded as the ping magnitude.

In order for a ping to be recognized as a candidate and passed to the next phase, the following two conditions must be met:

The error must be sufficiently small relative to the ping magnitude. The ping magnitude is divided by the square root of the error. This result is effectively a "shape matching" metric; scaling the input has no effect on this ratio. The ping is rejected, per step 154, if the ratio is less than parameter PingRatThresh (labeled "A" in FIG. 17 for convenience), which is dimensionless. A high ping magnitude value with a low error value constitutes a good match.

The magnitude of the ping must be at least MinPingMag (labeled "B" in FIG. 17 for convenience), as per step 156. This is in signal units.

If the decisions in steps 154 and 156 are favorable, then step 158 outputs this portion of the input signal as a candidate ping for further processing by symbol identification step 136.

Even though a portion of the input signal has been accepted as a candidate ping, it may in fact be an impostor. To aid in the determination of proper pings, the coding method uses a pairing of pings to create symbols. The symbols that are inserted by the encoder have very clear and unique characteristics that make detection of false pings easier.

Figure 18:
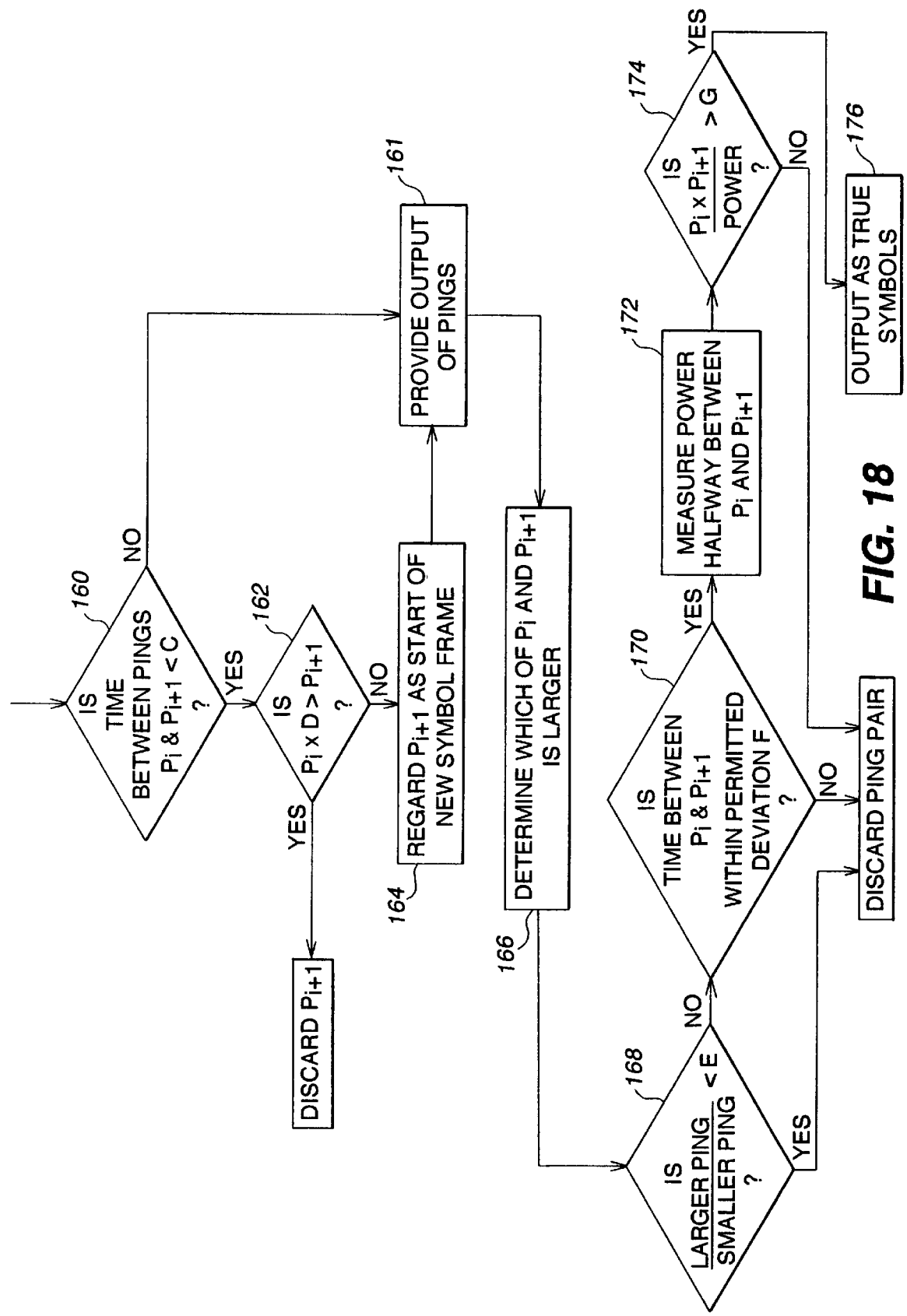
FIG. 18 is a flow chart for the symbol identification function.

Details of symbol identification are shown in FIG. 18. Test 160 compares the time between two consecutive candidate pings against a threshold C which is less than the fixed time between consecutive pings (as explained below). If the spacing is greater than the threshold, step 161 outputs the signal as a real ping for further processing in connection with symbol identification. If the two pings occur too close to each other for them to be a symbol pair, a test 162 is performed to determine which ping is to be rejected. The magnitude of the first ping is multiplied by the parameter "NewPingShadow" (called "D" in FIG. 18 for convenience), which is normally set to 0.1. If the amplitude of the second ping is less than the result, it is discarded as a false ping. If it is larger, then it is considered per step 164 to be the start of a new symbol frame to be outputted as a ping by step 161.

Pings that are inserted as symbols will have the same amplitude at the time of insertion, as explained above in connection with the encoder. If they do not have the same amplitude during decoding, step 166 determines which of two consecutive pings is larger. The ratio of the amplitude of the larger ping to the smaller is compared by step 168 to the "MaxPingSkew" parameter (labeled "E" in FIG. 17 for convenience). The result must not exceed the threshold set by this parameter; otherwise, the pings are considered not to be a symbol pair.

The spacing between ping pairs in a symbol is fixed at 4.354 msec. The spacing between consecutive pings is calculated and compared in step 170 to this fixed spacing. The absolute discrepancy between the calculated spacing and the fixed spacing must not exceed the "MaxPingSpacDev" parameter (labeled "F" in FIG. 18 for convenience).

Symbol insertion creates a "quiet" portion between pings. The power of the band-limited, normalized, signal is measured by step 172 within a one T time window about a point halfway between the candidate pings. In a true symbol, there is very little signal energy there. The product of the magnitude of the two pings is divided by the measured power signal. The result, as determined by step 174, must exceed the "MaxGapRatio" parameter (labeled "G" in FIG. 18 for convenience) for the two pings to be considered a true symbol. If so, step 176 outputs the pings as a true symbol.

The true symbols outputted by step 136 are then collected and the resultant code is determined by code assembly step 138 by applying the information set forth above in Table 7.

TABLE 8

| Parameter | Value |
|---|---|
| PingRatThresh | 10 |
| MinPingMag | 200 |
| Threshold C | 3T-181 $\mu$sec. |
| NewPingShadow | 0.1 |
| MaxPingSkew | 5.0 |
| MaxPingSpacDev | 181 $\mu$sec. |
| MaxGapRatio | 250 |

Although specific embodiments of the invention have been described above in detail, it should be understood that various modifications thereto can readily be made by anyone with ordinary skill in the art. For example, operation of the encoder is not done in real time relative to, for example, live broadcast of an audio product. However, if processing delay is of a fixed and acceptable amount then the encoding could be done in real time. Operation of the decoder is normally done in real time. Implementation of the encoder and decoder can be in hardware (e.g. digital signal processors) or software depending on the specific requirements and tolerances of the particular application. The locator function has been described as performing the minimum spacing test first and then the masking test. However, this sequence can be inverted. Each record 44 stores two in-band envelope levels, but it is also contemplated that storing only one would suffice. Also, rather than having parallel signal paths 22 and 34, these could be implemented to operate sequentially. All such modifications are intended to fall within the scope of the invention, as defined by the following claims.

We claim:

1. A method for embedding a digital code in a digitized audio product, comprising the steps of:
   filtering the digitized audio product to a frequency band of interest;
   determining a tonality indication for each of a plurality of segments of the filtered audio product which indicates the extent to which power is distributed uniformly for frequencies in at least a portion of said band of interest; and
   inserting at least a portion of the digital code into a particular segment from said plurality of segments only if said tonality indication indicates a relatively uniform power distribution in said particular segment.

2. The method of claim 1, wherein said inserting step is performed only if at least one of the segments immediately before and immediately after said particular segment also has a tonality indication which indicates a relatively uniform power distribution.

3. The method of claim 1, wherein all of said plurality of segments have a uniform duration.

4. The method of claim 1, further comprising the step of determining the total power for at least said particular segment, and performing said inserting step only if said total power is above a predetermined threshold.

5. A method for embedding a digitized code in a digitized audio product, comprising the steps of:
   filtering the digitized audio product to a frequency band of interest;
   providing a coding signal derived from a band-limited impulse function with a waveform having its energy confined to and evenly spread across at least a portion of said frequency band of interest;

deriving said digitized code from said coding signal; and embedding said digitized code into said audio product.

6. The method of claim 5, wherein said frequency band of interest is approximately 0 to 5000 Hz, and said coding signal has energy spread across approximately 1500 to 4000 Hz.

7. The method of claim 5, wherein said digitized code is derived based on polarity of said coding signal.

8. The method of claim 5, wherein each bit of said digitized code is derived based on a plurality of said coding signals.

9. The method of claim 5, wherein said coding signal is derived from an ideal mathematical impulse function to which a steep bandpass filter is applied.

10. A method for providing a digitized code to be embedded in a digitized audio product, comprising the steps of:

providing said digitized code as a series of binary bits;

dividing said binary bits into groups, each group having a plurality of bits;

providing coding signals to represent said bits, respectively;

deriving a symbol from said coding signals for each of said groups, each symbol having a plurality of said coding signals with a preset spacing therebetween.

11. The method of claim 10, wherein each symbol has coding signals equal in number to bits in a group to which such symbol corresponds.

12. The method of claim 10, wherein the coding signals are identical to each other in shape, with one binary bit corresponding to a coding signal of one polarity, and the other binary bit corresponding to a signal of the other polarity.

13. The method of claim 10, wherein a symbol consists of two of said coding signals.

14. The method of claim 10, wherein a symbol consists of three of said coding signals with equal spacing between adjacent ones.

15. A method for encoding and decoding a digitized code embedded in a digitized audio product, comprising the steps of:

deriving said digitized code in a form of start, data and end symbol types, each symbol representing a plurality of bits, and each bit being associated with a coding signal of given polarity;

generating said start type of symbol to consist of a plurality of said coding signals all of which have the same designated polarity;

embedding said digitized code in said digitized audio product;

detecting said digitized code embedded in said audio product; and decoding said detected digitized code by determining whether the polarity of the coding signals on said start type of symbol is said designated polarity and, if not, inverting the polarity of said coding signals in said data and end types of symbols.

16. A method for embedding a digitized code in a digitized audio product, comprising the steps of:

identifying segments of the digitized audio product into which the digitized code can be embedded based on predetermined criteria;

generating portions of the digitized code for insertion into said segments, respectively;

removing the digitized audio product within said identified segments except for a predetermined small percentage of amplitude to generate modified segments; and inserting said portions of the digitized code into said modified segments, respectively.

17. A method for embedding a digitized code in a digitized audio product, comprising the steps of:

analyzing the digitized audio product to derive measured values for designated characteristics thereof;

locating segments of the digitized audio product, based on said derived measured values and a set of preselected parameters, into which the digitized code can be inserted so as to be masked;

inserting the digitized code into said located segments;

determining whether a degree of masking of the inserted digitized code meets a predetermined level and, if not, modifying values of at least one of said set of preselected parameters, and then performing said locating and inserting steps again with said modified values.

18. A method for embedding a digitized code in an audio product, comprising the steps of:

dividing said digitized code into preselected portions;

representing said portions by a plurality of coding symbols, respectively;

determining spacing of said coding symbols from each other to be used for embedding the digitized code within the audio product so that said spacing is greater than a predetermined minimum, and inserting the coding symbols within the audio product based on said determined spacing.

19. The method of claim 18, wherein said predetermined minimum spacing for a present symbol is in relation to a location of a previous symbol.

20. The method of claim 18, wherein said predetermined minimum spacing for a present symbol is in relation to a location of the immediately preceeding previous two symbols.

21. The method of claim 18, wherein said spacing is derived to produce a random spacing.

22. A method for decoding an audio product into which a code of digitized coding signals has been embedded, comprising the steps of:

obtaining a digitized audio product;

comparing said digitized audio product with a template of a coding signal to identify candidate coding signals based on shape;

comparing pairs of sequential candidate coding signals with each other based on preselected characteristics to identify which ones constitute the coding signals; and reconstructing said code from said coding signals identified by said comparing step.

23. The method of claim 22, wherein said comparing step compares amplitude.

24. The method of claim 22, wherein said comparing step compares a predetermined spacing with spacing between a sequential pair of said candidate coding signals.

* * * * *